US008321064B2

(12) United States Patent
Itoh et al.

(10) Patent No.: US 8,321,064 B2

(45) Date of Patent: Nov. 27, 2012

(54) GRID INTERCONNECTION DEVICE, GRID INTERCONNECTION SYSTEM, AND POWER CONTROL SYSTEM

(75) Inventors: Kazuo Itoh, Osaka (JP); Masahiro Makino, Osaka (JP); Toshiyuki Hirata, Osaka (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 336 days.

(21) Appl. No.: 12/713,743

(22) Filed: Feb. 26, 2010

(65) Prior Publication Data

US 2010/0217453 A1 Aug. 26, 2010

(30) Foreign Application Priority Data

Feb. 26, 2009 (JP) ................................ 2009-044447
Jan. 25, 2010 (JP) ................................ 2010-013104

(51) Int. Cl.
*G05D 3/12* (2006.01)

(52) U.S. Cl. ......... 700/297; 700/295; 700/291; 320/109

(58) Field of Classification Search .................. 700/286, 700/291, 295–297; 320/109
See application file for complete search history.

(56) References Cited

U.S. PATENT DOCUMENTS 6,081,205 A * 6/2000 Williams .................. 340/932.2
2006/0064205 A1* 3/2006 Ying ............................ 700/286
2008/0114499 A1* 5/2008 Hakim et al. ................. 700/291

FOREIGN PATENT DOCUMENTS

JP 10248180 9/1998

* cited by examiner

*Primary Examiner* — Sean Shechtman
(74) *Attorney, Agent, or Firm* — NDQ&M Watchstone LLP

(57) ABSTRACT

A grid interconnection device 100 for interconnecting a power storage device to a power distribution system to which alternating current power is distributed, the grid interconnection device comprises a receiver 101 and a controller 104. The receiver 101 receives a second adjustment instruction transmitted before a first adjustment instruction. The controller 104 controls the power storage amount on the basis of the second adjustment instruction.

5 Claims, 17 Drawing Sheets

[CURRENT INSTRUCTION] CHARGE                      1kwh
[NEXT INSTRUCTION]    DISCHARGE                   1kwh
[CURRENT INSTRUCTION] BACKWARD FLOW APPROVAL
[NEXT INSTRUCTION]    BACKWARD FLOW PROVIDE REQUEST
REMAINING TIME UNTIL NEXT INSTRUCTION
OPERATING CONDITIONS
    PURCHASED ELECTRICITY : 2kwh
    SOLD ELECTRICITY : 0kwh
    RESTRICTION ON POWER SUPPLY : NO

GRID INTERCONNECTION DEVICE, GRID INTERCONNECTION SYSTEM, AND POWER CONTROL SYSTEM

CROSS REFERENCE TO RELATED APPLICATIONS

This application is based upon and claims the benefit of priority from prior Japanese Patent Application No. 2009-044447, filed on Feb. 26, 2009 and Japanese Patent Application No. 2010-013104, filed on Jan. 25, 2010; the entire contents of which are incorporated herein by reference.

BACKGROUND OF THE INVENTION

1. Field of the Invention

The present invention relates to a grid interconnection device and a power control system configured to control a backward flow power toward a power distribution system.

2. Description of the Related Art

Nowadays, there have been increasing cases where a power supply device and a power storage device are provided in a customer (for example, a house and a factory) supplied with alternating current power from a substation. Specifically, plural power distribution systems are provided under the management of the substation, and the power supply device and the power storage device are connected to one of the power distribution systems through a grid interconnection device. Electric power supplied from the power supply device is not only supplied to power consumption devices such as a household electric appliance provided in its own customer, but also may be provided to the power distribution system as a backward flow through the grid interconnection device.

Here, if consumed power of the power consumption devices installed in each of customers reaches a peak as in the case of the afternoon in summer, for example, the consumed power in each customer may exceed the electric power supplied from the substation.

To address this problem, there has been proposed a technique for providing, within an acceptable range, the backward flow of the electric power supply from the power supply device in each customer in accordance with an instruction from the substation (see Japanese Patent Application Publication No. Hei 10-248180).

SUMMARY OF THE INVENTION

However, the technique disclosed in Japanese Patent Application Publication No. Hei 10-248180 does not consider the backward flow of the electric power stored in the power storage device. Thus, when the amount of backward flow needs to be increased, the amount of backward flow cannot be increased up to a desired amount if the power storage device has a small remaining volume of power.

In contrast, when the amount of backward flow needs to be reduced, the amount of backward flow cannot be reduced down to a desired amount if the power storage device has a large remaining volume of power.

The present invention has been made to solve the aforementioned problem, and an object of the present invention is to provide a grid interconnection device, a grid interconnection system, and a power control system capable of controlling the amount of backward flow from each customer.

A grid interconnection device according to the characteristic of the present invention is a grid interconnection device for interconnecting a power storage device to a power distribution system to which alternating current power is distributed. The grid interconnection device comprises: a controller configured to control input/output power indicating forward flow power that flows from the power distribution system to the power storage device and/or backward flow power that flows reversely from the power storage device to the power distribution system; and a receiver configured to receive a first adjustment instruction to adjust or set the input/output power, and a second adjustment instruction to adjust a power storage amount in the power storage device, the first adjustment instruction transmitted through a predetermined transmission path, the second adjustment instruction transmitted through the predetermined transmission path before the first adjustment instruction, wherein the controller controls the input/output power on the basis of the first adjustment instruction, and controls the power storage amount on the basis of the second adjustment instruction.

In the grid interconnection device according to the characteristic of the present invention, the second adjustment instruction may indicate an increase of the power storage amount, and the first adjustment instruction may indicate an increase of the backward flow power.

In the grid interconnection device according to the characteristic of the present invention, the second adjustment instruction may indicate a decrease of the power storage amount, and the first adjustment instruction may indicate a decrease of the backward flow power or an increase of the forward flow power.

A grid interconnection system according to the characteristic of the present invention comprises: a grid interconnection device for interconnecting a power storage device to a power distribution system to which alternating current power is distributed, wherein the grid interconnection device comprises: a controller configured to control input/output power indicating forward flow power that flows from the power distribution system to the power storage device and/or backward flow power that flows reversely from the power storage device to the power distribution system; and a receiver configured to receive a first adjustment instruction to adjust or set the input/output power, and a second adjustment instruction to adjust a power storage amount in the power storage device, the first adjustment instruction transmitted through a predetermined transmission path, the second adjustment instruction transmitted through the predetermined transmission path before the first adjustment instruction, wherein the controller controls the input/output power on the basis of the first adjustment instruction and controls the power storage amount on the basis of the second adjustment instruction.

A power control system according to the characteristic of the present invention comprises: a power distribution facility configured to distribute alternating current power to a power distribution system; and a plurality of customers each including a grid interconnection device configured to interconnect a power storage device to the power distribution system, wherein the plurality of customers are grouped into a plurality of groups, the grid interconnection device comprises: a controller configured to control input/output power indicating forward flow power that flows from the power distribution system to the power storage device and/or backward flow power that flows reversely from the power storage device to the power distribution system; a receiver configured to receive a first adjustment instruction to adjust or set the input/output power, and a second adjustment instruction to adjust a power storage amount in the power storage device, the first adjustment instruction transmitted through a predetermined transmission path, the second adjustment instruction transmitted through the predetermined transmission path before the first adjustment instruction; and a determination unit configured to determine whether or not an own group to which the grid interconnection device belongs to is an application group, on the basis of group information being included in each of the first adjustment instruction and the second adjustment instruction and indicating the application group to which each of the first adjustment instruction and the second adjustment instruction is applied among the plurality of groups, wherein the controller controls the input/output power on the basis of the first adjustment instruction and controls the power storage amount on the basis of the second adjustment instruction if the determination unit determines that the own group is the application group.

In the power control system according to the characteristic of the present invention, the power distribution facility may comprise: a calculator configured to calculate an adjustment amount or a set amount of the input/output power on the basis of a history of a voltage value of the power distribution system or a history of a power usage amount in the customer, and an instruction generator configured to generate the first adjustment instruction including information that indicates the adjustment amount or the set amount calculated by the calculator.

In the power control system according to the characteristic of the present invention, the power distribution facility may comprise: a calculator configured to calculate an adjustment amount or a set amount of the input/output power on the basis of a weather condition; and an instruction generator configured to generate the first adjustment instruction including information that indicates the adjustment amount or the set amount calculated by the calculator.

In the power control system according to the characteristic of the present invention, the power distribution facility may comprise: a calculator configured to calculate an adjustment amount or a set amount of the input/output power on the basis of information on an event that influences power consumption in a customer; and an instruction generator configured to generate the first adjustment instruction including information that indicates the adjustment amount or the set amount calculated by the calculator.

According to the present invention, a grid interconnection device, a grid interconnection system, and a power control system capable of controlling the amount of backward flow from each customer can be provided.

DETAILED DESCRIPTION OF THE INVENTION

Figure 1:
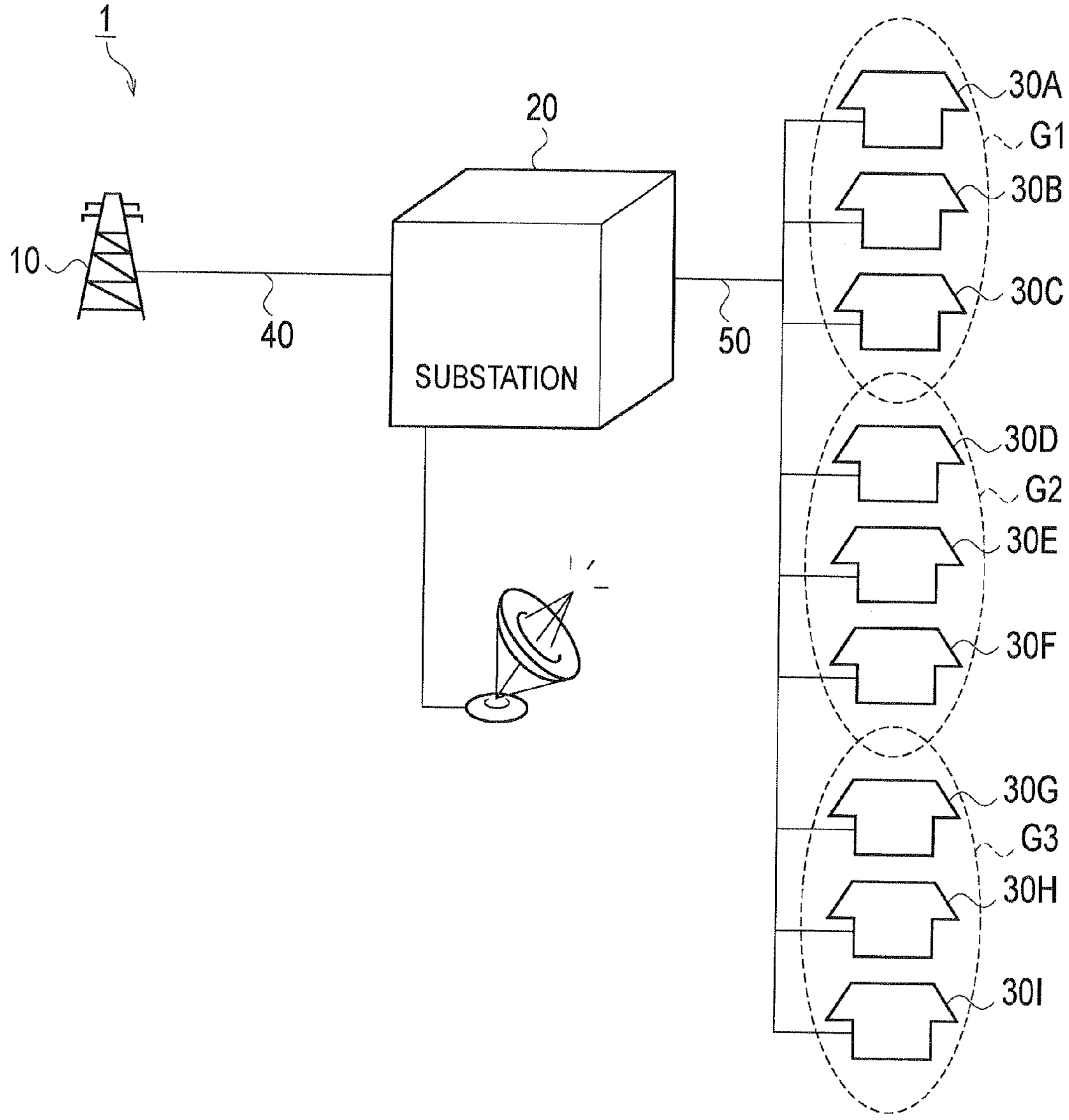
FIG. 1 is a schematic diagram showing a configuration of a power control system 1 according to a first embodiment.

Hereinafter, a power control system according to embodiments of the present invention will be described with reference to the drawings. Note that, in the descriptions of the drawings below, the same or similar portions are denoted by the same or similar reference numerals.

It should be noted, however, that the drawings are schematic, and that the dimensional proportions and the like are different from their actual values. Accordingly, specific dimensions and the like should be inferred based on the description given below. Moreover, obviously, dimensional relationships and proportions may differ from one drawing to another in some parts.

Generally, a flow of electric power from a power distribution system toward a customer is called a "forward flow," and electric power that flows, namely, electric power inputted from a power distribution system to a customer is called "forward flow power." In addition, a flow of electric power from a customer toward a power distribution system is called a "backward flow," and electric power that reversely flows, namely, electric power outputted from a customer to a power distribution system is called "backward flow." Note that the "forward flow power" and "backward flow power" are also referred to as "input/output power."

[First Embodiment]

Hereinafter, a first embodiment of the present invention will be described. In the first embodiment, descriptions will be given for the case where consumed power reaches a peak in the daytime as in the case of the day of an event in the neighborhood, or a summer day. For this reason, the first embodiment aims to resolve a shortage of power in the daytime by increasing backward flow power.

(Configuration of Power Control System)

Hereinafter, a configuration of the power control system according to the first embodiment will be described with reference to FIG. 1. FIG. 1 is a schematic diagram showing a configuration of a power control system 1 according to the first embodiment.

As shown in FIG. 1, the power control system 1 includes a high-voltage power source 10, a substation 20, and plural customers 30 (customers 30A to 30I).

The high-voltage power source 10 transmits high-voltage power to the substation 20 through a high-voltage power line 40. The high-voltage power source 10 is a power plant, for example.

The substation 20 distributes alternating current power generated by stepping down the high-voltage power, to the customers 30 through a power distribution system 50. The power distribution system 50 is a unit in which the substation 20 manages the customers 30. Note that the substation 20 may include plural power distribution systems 50 under its management, although not illustrated. A configuration of the substation 20 will be described later.

Each of the customers 30 is electrically connected to the substation 20 through the power distribution system 50 to which the alternating current power is distributed. The customer 30 receives and outputs electric power from and to the power distribution system 50 according to needs.

Here, the plural customers 30 are grouped into plural groups G (groups G1 to G3). Specifically, the plural customers 30 are grouped so that the total amounts of backward flow power from the respective groups G to the power distribution system 50 can be almost equal to each other. Therefore, the maximum amount of backward flow power that a group of the customers 30A to 30C is allowed to provide is substantially equal to the maximum backward flow power that each group of the customers 30D to 30F and the customers 30G to 30I is allowed to provide.

Note that the maximum backward flow power from each of the customers 30 can be identified in advance on the basis of a contract capacity to be described later, rated output power of the power supply device 32 to be described later, and a power storage capacity of a power storage device 33 to be described later.

(Configuration of Substation)

Figure 2:
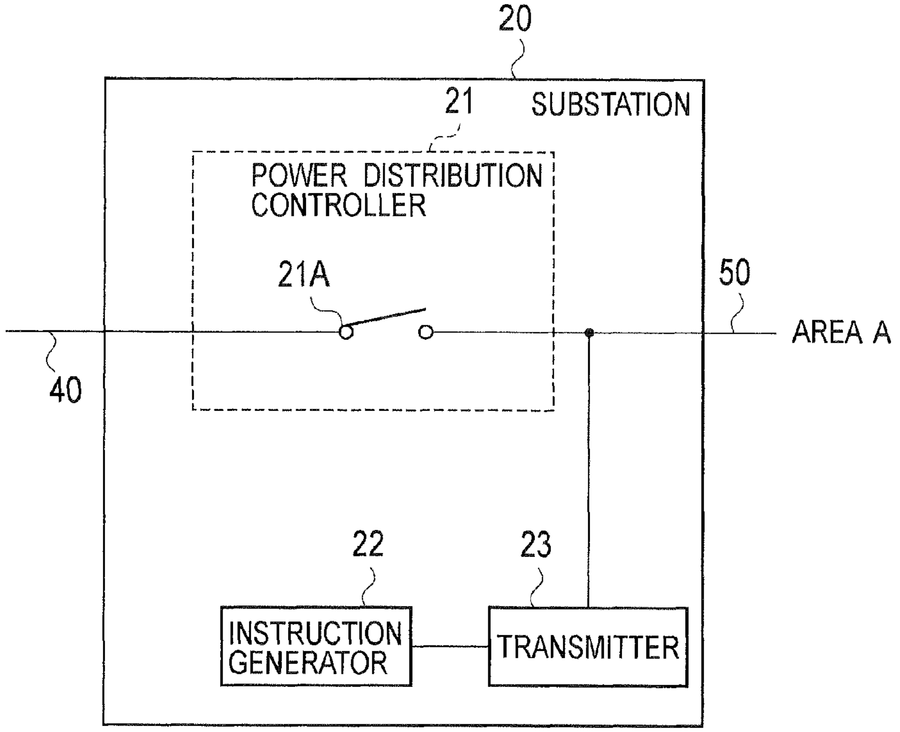
FIG. 2 is a block diagram showing a configuration of a substation 20 according to the first embodiment.

Hereinafter, a configuration of the substation according to the first embodiment will be described with reference to FIG. 2. FIG. 2 is a block diagram showing a configuration of the substation 20 according to the first embodiment.

As shown in FIG. 2, the substation 20 includes a power distribution controller 21, an instruction generator 22, and a transmitter 23.

The power distribution controller 21 includes a relay 21A. The relay 21A switches whether or not to distribute alternating current power, which a transformer (not shown) generates by stepping down the high-voltage power, to the power distribution system 50.

The instruction generator 22 generates a first adjustment instruction that is an instruction to adjust the backward flow power from each customer 30. Note that, in this embodiment, the "first adjustment instruction" is a collective term for "backward flow provide request" requesting the customer 30 to increase the backward flow power, "backward flow approval" allowing the customer 30 to increase and decrease the backward flow power at its own discretion, and "backward flow disapproval" instructing the customer 30 to stop the backward flow power. As described above, the first embodiment is intended to resolve a shortage of power by increasing the backward flow power on the basis of the backward flow provide request.

Moreover, the instruction generator 22 generates a second adjustment instruction that is an instruction to adjust a power storage amount in the power storage device 33 provided to each customer 30, before the first adjustment instruction. Note that, in this embodiment, the "second adjustment instruction" includes a "charge request" for an increase of the power storage amount (charge) and a "discharge request" for a decrease of the power storage amount (discharge).

In addition, the instruction generator 22 incorporates group information into each of the first and second adjustment instructions, the group information indicating an application group Gp to which the first and second adjustment instructions are applied. This enables the first and second adjustment instructions to be applied only to the customers 30 included in the application group Gp. Therefore, in this embodiment, the instruction generator 22 can generate the first and second adjustment instructions having different contents for the groups G1 to G3, respectively. A cycle of generating (transmitting) the first and second adjustment instructions for the groups G will be described later.

Moreover, the instruction generator 22 incorporates time information into each of the first and second adjustment instructions, the time information indicating a time period in which the adjustment instruction is applied. Instead of using the time information, the instruction generator 22 may generate new first and second adjustment instructions periodically (every hour, for example).

Further, the instruction generator 22 incorporates backward flow power information, which indicates the backward flow power and the power storage amount, into each of the first and second adjustment instructions. Accordingly, the shortage of power in the daytime can be efficiently resolved. Here, the backward flow power information can be determined on the basis of the following four methods.

(1) First Method

Figure 3:
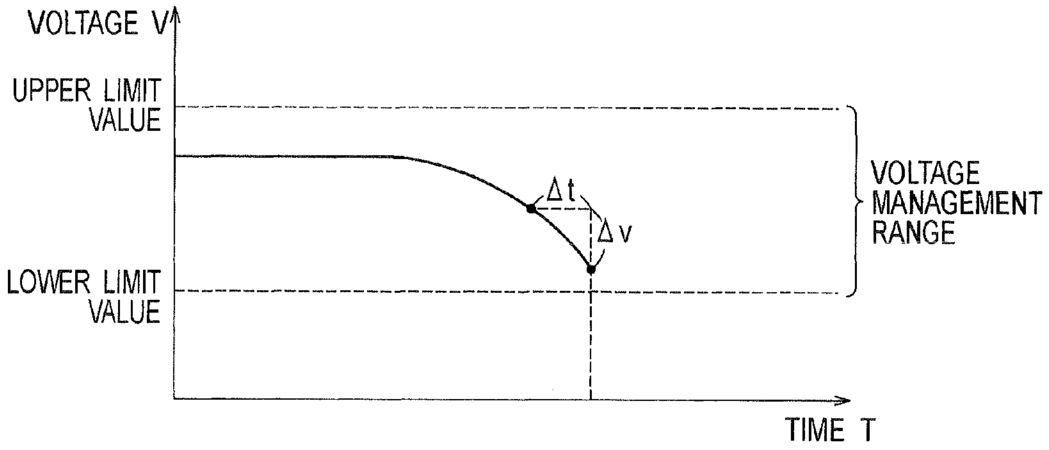
FIG. 3 is a diagram for explaining a method for calculating backward flow power information included in backward flow information according to the first embodiment.

A first method is a method of calculating how much amount of backward flow power from each customer 30 should be obtained to resolve a shortage of power, on the basis of a voltage drop tendency (voltage drop range $\Delta v$/time duration $\Delta t$) in the power distribution system 50 as shown in FIG. 3, the contract capacity, the rated output power of the power supply device 32, and the power storage capacity of the power storage device 33.

When the customer 30 introduces a power consumption device 31, the power supply device 32, and the power storage device 33 (at the time of power-receiving contract), the contract capacity is determined and companies which provide and manage the power distribution system 50 such as a power company (an owner and operator of the power grid, and an operation manager of the power transmission and distribution system) are notified of the rated output power of the power supply device 32, the power storage capacity of the power storage device 33, and the like. Note that, therefore, the substation 20 can obtain the information presented to the power company. The voltage V may be measured at each grid interconnection point at which a grid interconnection device of a customer 30 is connected to the power distribution system 50. In this case, an average value, a largest value, or a smallest value of measured voltage values at the grid interconnection point may be determined as the voltage V.

(2) Second Method

A second method is a method of calculating how much amount of backward flow power from the customer 30 should be obtained to resolve the shortage of power in consideration of weather conditions on the day (real-time data, forecast data, and the like), a season, time, calendar information, and the presence or absence of: an event such as a sportscast (an increase in power consumption by using power consumption devices such as an air conditioner and a television set in the customer 30 for watching of, a live broadcast of a soccer or basket ball game, a high school baseball game in midsummer and the like, an Olympic games broadcast, and the like); or an event in the power distribution system 50 (an increase in power consumption at a venue for a concert or the like and neighboring facilities).

(3) Third Method

A third method is a method of calculating how much amount of backward flow power from the customer 30 should be obtained to resolve the shortage of power, on the basis of the amount of forward flow/backward flow calculated from, for example, the type and the rated output power of the power supply device 32 provided to each customer 30, in addition to the weather conditions on the day mentioned in the second method.

Here, the power supply device 32 is classified into several types. Examples of those types are: a type having rated output power with a certain value or higher, a public use type, an environment-friendly clean energy type such as a photovoltaic power generator and a wind turbine generator, and a reliable supply type such as a gas engine generator and a fuel cell power generator having no power output fluctuation caused by weather conditions and the like.

(4) Fourth Method

A fourth method is a method of calculating how much backward flow power from the customer 30 should be obtained to resolve the shortage of power, on the basis of prediction information derived from a history of past power consumption and the like and the amount of forward flow/backward flow calculated from the type and the rated output power of the power supply device 32 provided to the customer 30, and the like.

The transmitter 23 transmits the first and second adjustment instructions generated by the instruction generator 22 to each customer 30. Specifically, the transmitter 23 broadcasts the first and second adjustment instructions to all the customers 30 through the power distribution system 50 (a power line communication and the like).

Instead, the transmitter 23 transmits the first and second adjustment instructions to the customers 30 through a transmission path different from that of the power distribution system 50. For example, the transmitter 23 transmits the first and second adjustment instructions to all the customers 30 by using a data distribution segment provided separately from a content distribution segment in the terrestrial digital broadcasting.

(Configuration of Customer)

Figure 4:
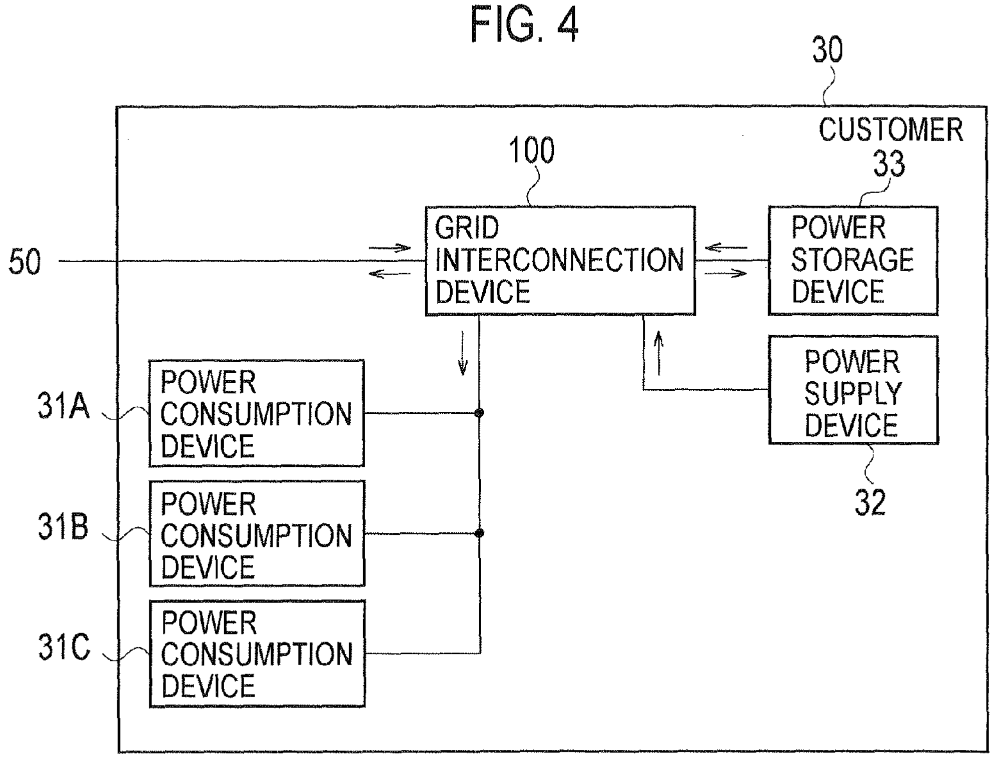
FIG. 4 is a block diagram showing a configuration of a customer 30 according to the first embodiment.

Hereinafter, a configuration of the customer according to the first embodiment will be described with reference to FIG. 4. FIG. 4 is a block diagram showing a configuration of the customer 30 according to the first embodiment. Note that the arrows in FIG. 4 indicate directions of inputs and outputs of electric power.

As shown in FIG. 4, the customer 30 includes plural power consumption devices 31 (power consumption devices 31A to 31C), the power supply device 32, the power storage device 33, and a grid interconnection device 100. The power supply device 32, the power storage device 33, and the grid interconnection device 100 form a grid interconnection system.

The power consumption devices 31 operate by consuming forward flow power transmitted from the power distribution system 50 and output power outputted by the power supply device 32. The power consumption devices 31 are household electric appliances, for example.

Examples of the power supply device 32 are a photovoltaic power generator, a wind turbine generator, a fuel cell power generator, and a gas engine generator. The power supply device 32 may be a secondary battery, an electric double-layer capacitor, or the like.

The power storage device 33 stores the output power outputted by the power supply device 32 and the forward flow power from the power distribution system 50. The power storage device 33 may be a secondary battery such as a lithium ion battery and a nickel hydride battery, an electric double-layer capacitor, or the like.

The grid interconnection device 100 controls interconnections among the power distribution system 50, the plural power consumption devices 31, the power supply device 32, and the power storage device 33. For example, when the grid interconnection device 100 controls the interconnection between the power distribution system 50 and the power storage device 33, the grid interconnection device 100 controls the backward flow power from the power storage device 33 to the power distribution system 50. A configuration of the grid interconnection device 100 will be described below.

(Configuration of Grid Interconnection Device)

Figure 5:
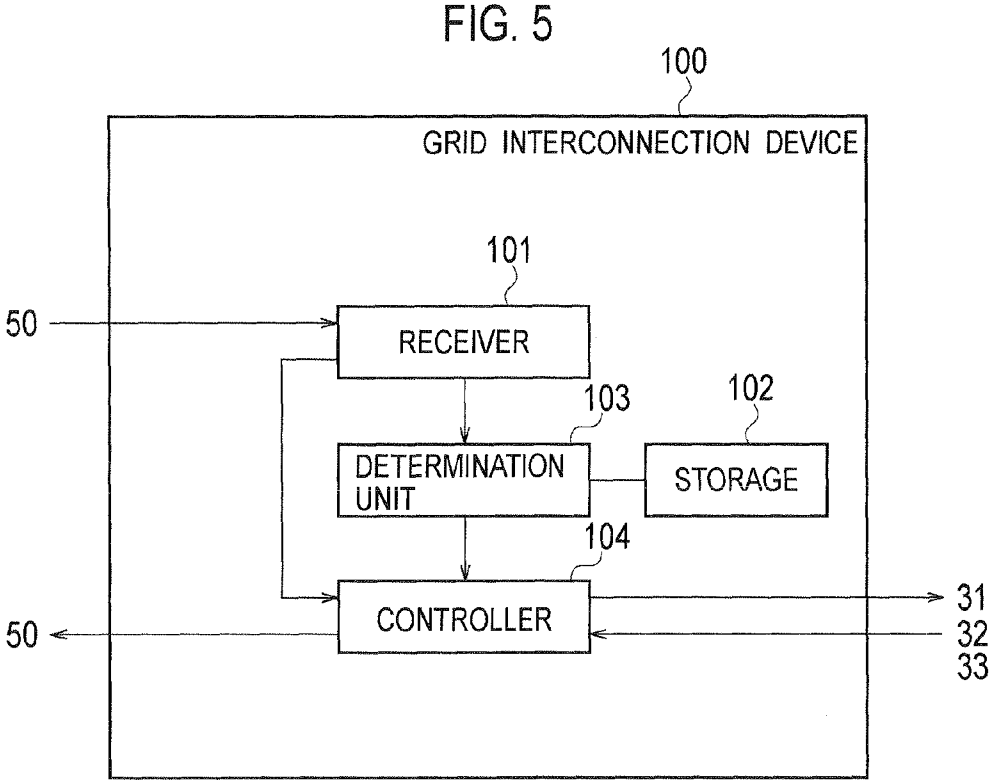
FIG. 5 is a block diagram showing a configuration of a grid interconnection device 100 according to the first embodiment.
Figure 6A:
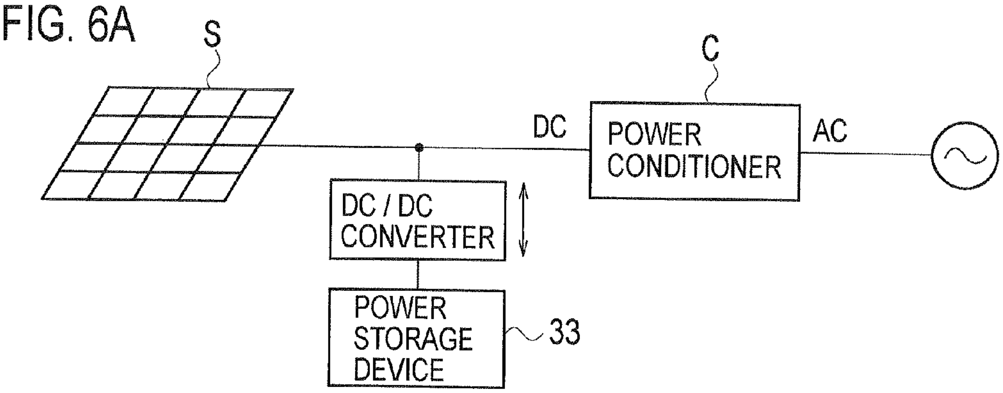
FIGS. 6A to 6D are diagrams for explaining schemes for connecting a power storage device 33 according to the first embodiment.
Figure 6B:
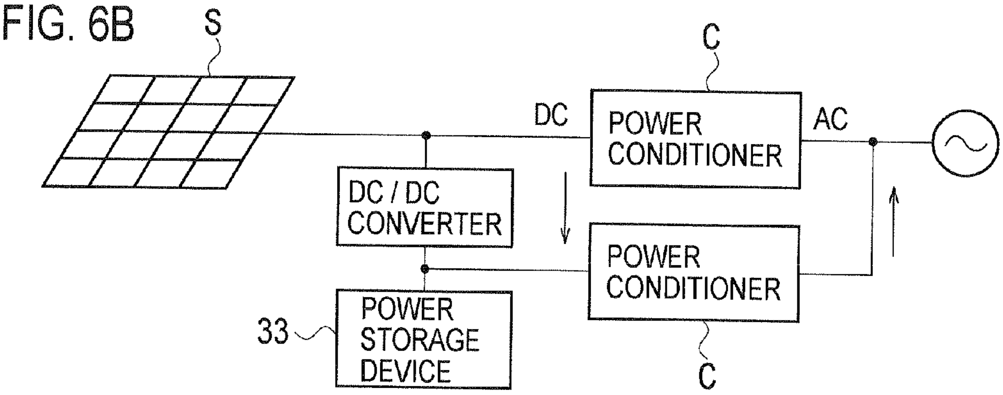
Figure 6C:
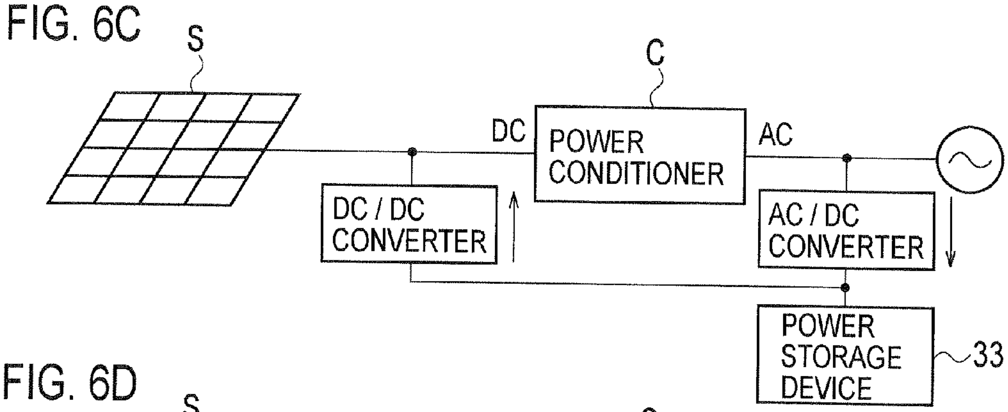
Figure 6D:
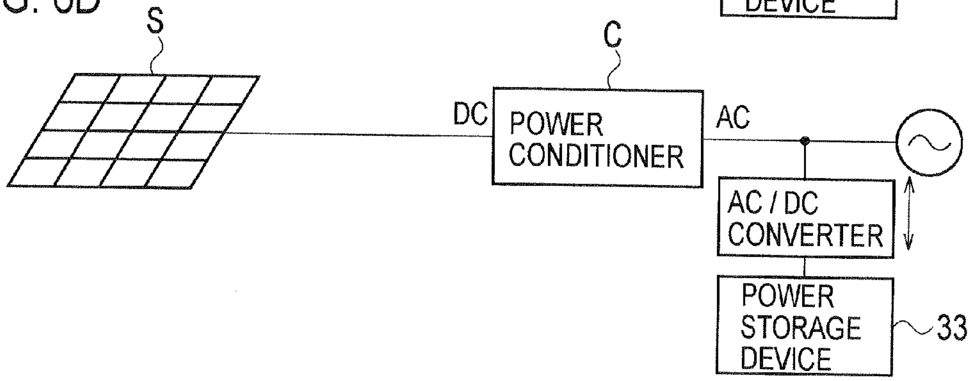

Hereinafter, a configuration of the grid interconnection device according to the first embodiment will be described with reference to FIG. 5. FIG. 5 is a block diagram showing a configuration of the grid interconnection device 100 according to the first embodiment.

As shown in FIG. 5, the grid interconnection device 100 includes a receiver 101, a storage 102, a determination unit 103, and a controller 104. The receiver 101 receives the aforementioned first and second adjustment instructions through the power distribution system 50 (a power line communication and the like) or the terrestrial digital broadcasting.

The storage 102 stores own group information that specifies an own group to which its customer 30 belongs. In addition, the storage 102 stores the contract capacity, the rated output power and the type of the power supply device 32, the power storage capacity of the power storage device 33, and the like.

The determination unit 103 determines whether or not the own group is the application group Gp on the basis of the group information included in the first adjustment instruction received by the receiver 101.

If the determination unit 103 determines that the own group is the application group Gp, the controller 104 controls the backward flow power and the power storage amount on the basis of the first and second adjustment instructions.

Now, a control of the controller 104 will be described by taking an example of the first and second adjustment instructions transmitted from the substation 20 to each group G. The table below shows an example of what are instructed by the first and second adjustment instructions. In the table below, the first adjustment instruction includes a backward flow provide request A, a backward flow approval B, and a backward flow disapproval C, and the second adjustment instruction includes a charge request P and a discharge request Q.

TABLE 1

| INSTRUCTION | TIME | | | | | | | | | |
|---|---|---|---|---|---|---|---|---|---|---|
| | 0-7 2nd | 8-9 1st | 9-10 1st | 10-11 1st | 11-12 1st | 12-13 1st | 13-14 1st | 14-15 1st | 15-16 1st | 16-24 2nd |
| G1 | P | B | C | C | B | A | A | A | B | Q |
| G2 | P | C | B | C | B | A | A | A | B | Q |
| G3 | P | C | C | B | B | A | A | A | B | Q |

As shown in the table above, the backward flow provide request A is transmitted to the groups G1 to G3 in the daytime (from 12 to 15 o'clock) when the consumed power reaches a peak. In preparation for this, during the nighttime (0 to 7 o'clock), the charge request P is transmitted to the groups G1 to G3. In the morning (8 to 12 o'clock), the backward flow approval B and the backward flow disapproval C are transmitted in combination with each other so that the groups G1 to G3 can provide the backward flow equally. From the early evening (16 to 24 o'clock), the discharge request Q is transmitted to the groups G1 to G3 in order to facilitate efficient charging during the nighttime (0 to 7 o'clock).

Upon receipt of the charge request P, the controller 104 stops the backward flow power, and causes the power storage device 33 to store the output power of the power supply device 32. Upon receipt of the discharge request Q, the controller 104 uses the electric power stored in the power storage device 33 as power supplied to the power consumption devices 31, or reversely provides the stored electric power as the backward flow power to the power distribution system 50.

In addition, upon receipt of the backward flow provide request A, the controller 104 provide the backward flow of the output power of the power supply device 32 and the electric power stored in the power storage device 33 within the range of target power indicated by electric power information.

Moreover, upon receipt of the backward flow approval B, the controller 104 can provide the backward flow of the output power of the power supply device 32 if the output power is larger than the consumed power of the power consumption devices 31. For example, when the controller 104 receives the backward flow approval B after receiving the backward flow provide request A, or when the price of power purchased from a customer is higher than the price of power sold to the customer, the output power of the power supply device 32 is preferably provided as the backward flow. Meanwhile, when the controller 104 receives the backward flow approval B before receiving the backward flow provide request A, the output power of the power supply device 32 is preferably stored in the power storage device 33 unless the power storage device 33 is fully charged.

In addition, upon receipt of the backward flow disapproval C, the controller 104 stores the output power of the power supply device 32 in the power storage device 33 even if the output power of the power supply device 32 is larger in amount than the consumed power of the power consumption devices 31. In other words, in this case, the controller 104 stops the backward flow power. Note that, on the other hand, the controller 104 can supply the forward flow power without any inhibition to the power consumption device 31 and the power storage device 33. Particularly, when the adjustment instruction includes the backward flow disapproval B and a forward flow receive request (not shown in Table 1) to increase the amount of forward flow, the controller 104 increases the forward flow power from the power distribution system 50 to the power consumption devices 31 and the power storage device 33.

Figure 7:
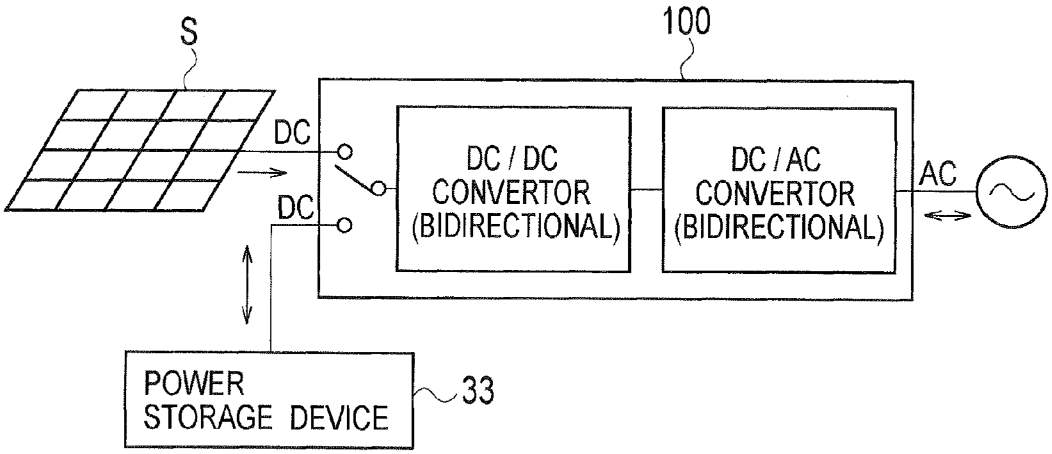
FIG. 7 is a diagram for explaining a scheme for connecting the power storage device 33 according to the first embodiment.

In addition, the controller 104 controls the output power of the power supply device 32 so that the output power can synchronize with the alternating current power of the power distribution system 50. Specifically, when the power supply device 32 is a direct current power supply (a photovoltaic power generator, for example), the controller 104 steps up direct current power outputted by the power supply device 32 by using a boost circuit and then converts the resultant direct current power into predetermined alternating current power for the purpose of synchronization with the alternating current power of the power distribution system 50. Here, FIGS. 6A to 6D are diagrams for illustrating schemes for connecting the power storage device 33 to a photovoltaic module S and a power conditioner C that are already present in the customer 30. Note that, in FIGS. 6A to 6D, the power storage devices 33 have input and output sources different from each other in terms of direct current and alternating current. FIG. 7 is a diagram for illustrating a scheme for newly installing the photovoltaic module S, the power conditioner C, and the power storage device 33. In the scheme shown in FIG. 7, the grid interconnection device 100 is used which has a bidirectional DC/DC converting unit and a bidirectional DC/AC converting unit in place of the power conditioner C and the converters shown in FIGS. 6A to 6D.

In contrast, when the power supply device 32 is an alternating current power supply (a wind turbine generator, for example), the controller 104 converts the alternating current power outputted by the power supply device 32 into direct current power by using a rectifier circuit and then converts the resultant direct current power into predetermined alternating current power by using an inverter circuit for the purpose of synchronization with the alternating current power of the power distribution system 50. Alternately, the controller 104 converts the alternating current power outputted by the power supply device 32 into predetermined alternating current power by using a matrix converter circuit, a cycloconverter circuit, or the like.

(Operation of Grid Interconnection Device)

Figure 8:
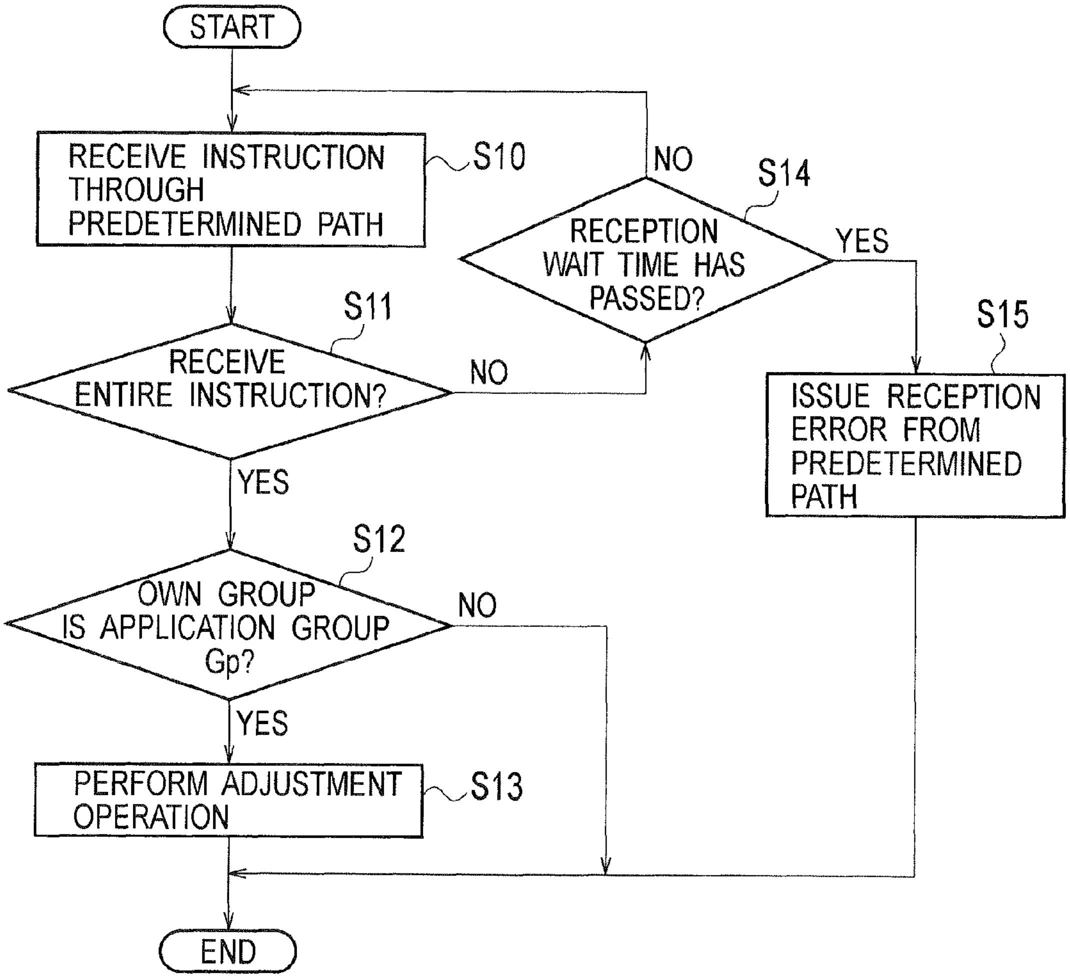
FIG. 8 is a flowchart showing determination processing of the grid interconnection device 100 according to the first embodiment.

Hereinafter, an operation of the grid interconnection device according to the first embodiment will be described with reference to FIG. 8. FIG. 8 is a flowchart showing determination processing of the grid interconnection device 100 according to this embodiment.

As shown in FIG. 8, in step S10, the grid interconnection device 100 receives the first and second adjustment instructions (hereinafter, simply called "the instructions") through a predetermined path.

In step S11, the grid interconnection device 100 determines whether or not the entire instruction is received through the predetermined path. If the entire instruction is received, the processing moves to step S12. If the entire instruction is not received, the processing moves to step S14.

In step S12, the grid interconnection device 100 determines whether or not the own group is designated as the application group indicated by the group information. If the own group is designated as the application group, the processing moves to step S13. If the own group is not designated as the application group, the processing terminates.

In step S13, the grid interconnection device 100 controls the backward flow power and the power storage amount on the basis of the instruction.

In step S14, the grid interconnection device 100 determines whether or not a predetermined reception wait time has passed or not. If the reception wait time has passed, the processing moves to step S15. If the reception wait time has not passed, the processing returns to step S10

In step S15, the grid interconnection device 100 issues a reception error indicating a failure to receive the instruction through the predetermined path. A user may be notified of the reception error by a warning sign or an alarm, for example.

Figure 9:
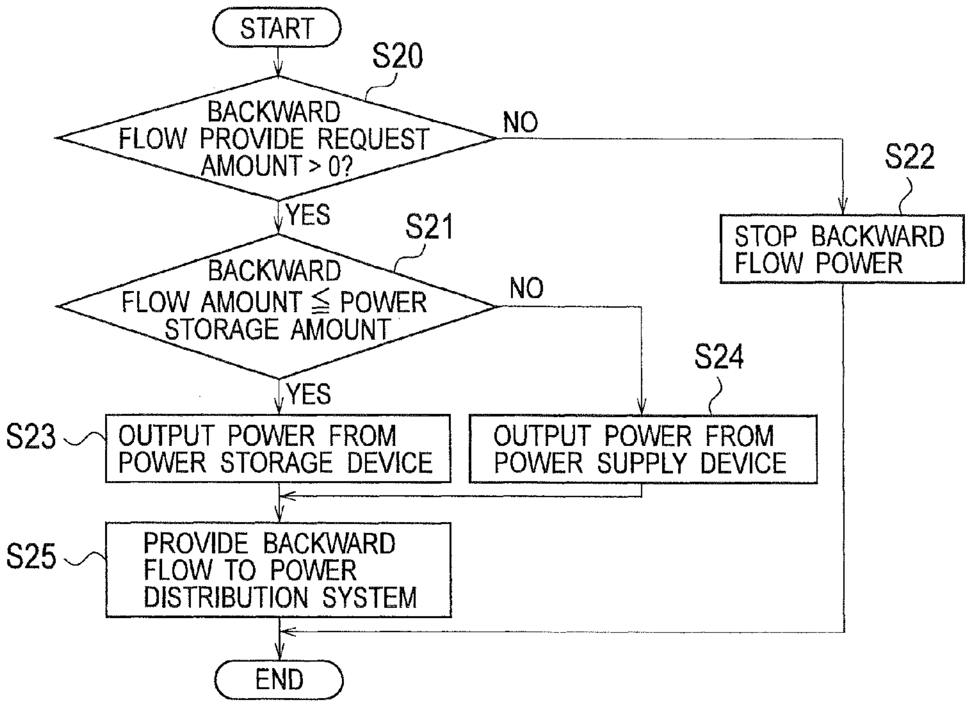
FIG. 9 is a flowchart showing processing of controlling backward flow power by the grid interconnection device 100 according to the first embodiment.

FIG. 9 is a flowchart showing processing of controlling the backward flow power by the grid interconnection device 100 according to the first embodiment.

As shown in FIG. 9, in step S20, the grid interconnection device 100 determines if the backward flow request amount is larger than zero, by referring to the electric power information included in the first adjustment instruction. If the backward flow request amount is larger than zero, the processing moves to step S21. If the backward flow request amount is zero or less, the backward flow power is stopped in step S25 and the processing terminates.

In step S21, the grid interconnection device 100 determines if the power storage amount in the power storage device 33 is equal to or larger than the backward flow request amount. If the power storage amount of the power storage device 33 is equal to or larger than the backward flow request amount, the processing moves to step S23. If the power storage amount of the power storage device 33 is smaller than the backward flow request amount, the processing moves to step S24.

In step S23, the grid interconnection device 100 causes the power storage device 33 to output electric power in accordance with the backward flow request amount.

In step S24, the grid interconnection device 100 causes the power supply device 32 to output electric power in accordance with the backward flow request amount.

In step S25, the grid interconnection device 100 reversely provides the backward flow power to the power distribution system 50.

Figure 10:
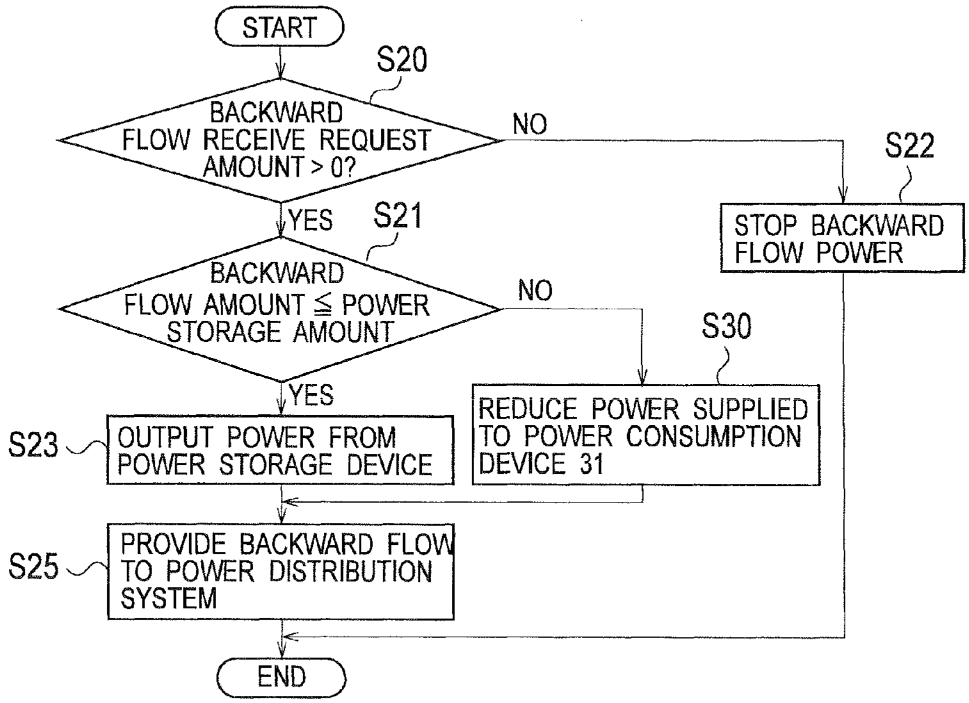
FIG. 10 is a flowchart showing processing of controlling the backward flow power by the grid interconnection device 100 according to the first embodiment.

FIG. 10 is a flowchart showing another type of processing of controlling the backward flow power by the grid interconnection device 100. A different point from the aforementioned processing in FIG. 9 is that the processing in FIG. 10 includes step S30, in place of S24, of reducing the power supply from the power supply device 32 to the power consumption device 31. With this step, by reducing power supply to the power consumption device 31, more output power of the power supply device 32 can be used as backward flow power.

(Advantageous Effects)

In the grid interconnection device 100 according to the first embodiment, the receiver 101 receives the second adjustment instruction transmitted before the first adjustment instruction. The controller 104 controls the power storage amount on the basis of the second adjustment instruction.

Specifically, in the first embodiment, the first adjustment instruction is the backward flow provide request, and the second adjustment instruction is the charge request. For this reason, electric power can be stored in advance for the case where the consumed power reaches a peak in a particular time period. Therefore, by using the electric power stored in the power storage device 33, the backward flow power can be increased up to a desired amount in the particular time period.

Moreover, the plural customers 30 are grouped into plural groups G, and the first and second adjustment instructions specify the application groups Gp to which the first and second adjustment instructions are applied. The controller 104 controls the backward flow power and the power storage amount when the determination unit determines the own group as the application group.

Accordingly, one group G and another group G are controlled by different instructions. Therefore, the amounts of backward flow can be controlled equally among the groups G. Specifically, as shown in Table 1, the amounts of backward flow among the groups G can be equalized by rotating the backward flow approval B and the backward flow disapproval C among the groups G.

[Modification of First Embodiment]

A modification of the first embodiment will be described below with reference to FIG. 11. Hereinafter, the description will be given mainly for the difference between this modification and the first embodiment.

Specifically, in the first embodiment, the plural customers 30 are grouped so that the total amounts of backward flow power from the respective groups G can be almost equal to each other. In contrast, in this modification, plural customers 30 are grouped so that the backward flow power from each of the groups G to the power distribution system 50 can be stable.

(Configuration of Power Control System)

Hereinafter, a configuration of a power control system according to the modification of the first embodiment will be described in reference to FIG. 11. FIG. 11 is a schematic diagram showing a configuration of a power control system 1 according to this modification.

Figure 11:
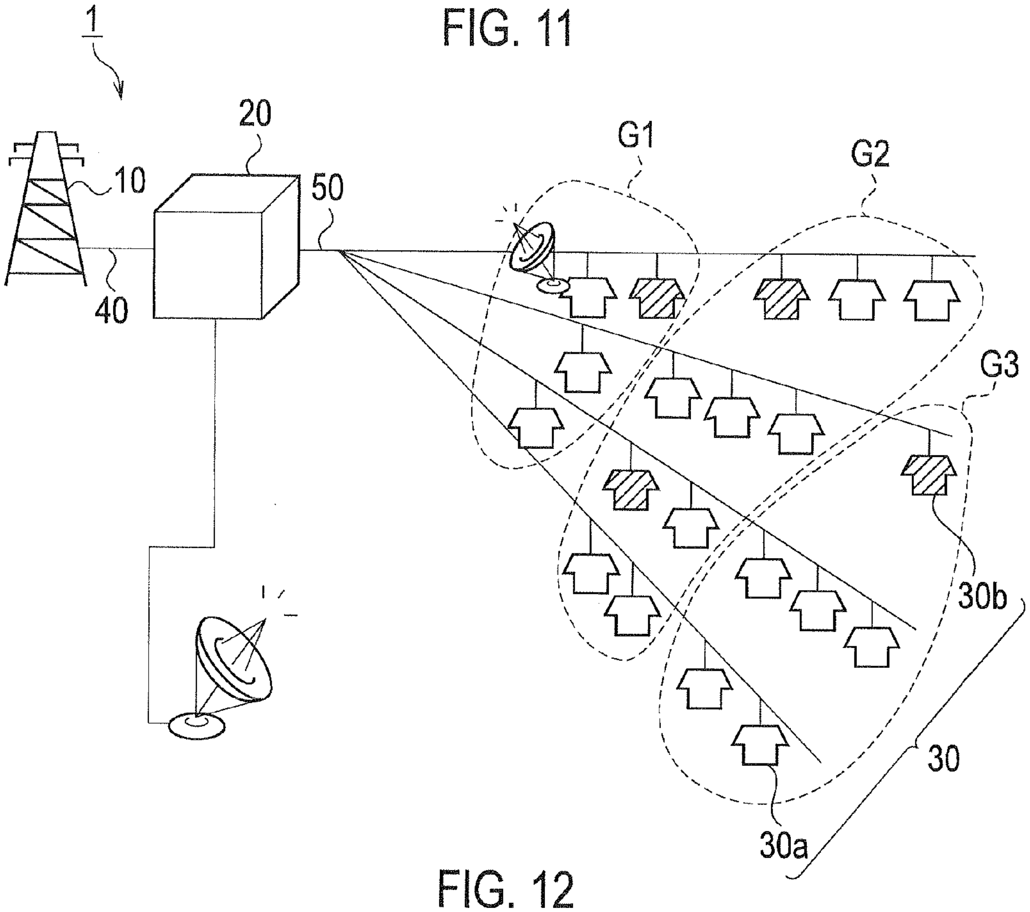
FIG. 11 is a schematic diagram showing a configuration of a power control system 1 according to a modification of the first embodiment.

As shown in FIG. 11, plural customers 30 includes a variation-type customer 30*a* provided with a power supply device 32 having high possibility of power output fluctuation due to changes of the weather and the like and a stable-type customer 30*b* provided with a power supply device 32 having low possibility of power output fluctuation due to changes of the weather and the like. The groups G1 to G3 each include the stable-type customer 30*b*.

The power supply device 32 having high possibility of power output fluctuation is, for example, a power supply device of an environment-friendly clean energy type such as a photovoltaic power generator and a wind turbine generator. The power supply device 32 having low possibility of power output fluctuation is, for example, a power supply device of a reliable supply type of power supply device such as a gas engine generator and a fuel cell power generator having no power output fluctuation caused by weather conditions and the like.

Here, a total rated output power (approximately 10 kW, for example) of the power supply devices 32 of the respective customers 30 included in the group G2 is substantially equal to a sum of a total rated output power (approximately 4 kW, for example) of the power supply devices 32 of the respective customers 30 included in the group G1 and a total rated output power (approximately 6 kW, for example) of the power supply devices 32 of the respective customers 30 included in the group G3.

Next, an example of what are instructed by the first and second adjustment instructions transmitted from the substation 20 to the groups G will be described using the table below.

TABLE 2

| INSTRUCTION | TIME 0-7 2nd | 8-9 1st | 9-10 1st | 10-11 1st | 11-12 1st | 12-13 1st | 13-14 1st | 14-15 1st | 15-16 1st | 16-17 1st | 17-24 2nd |
|---|---|---|---|---|---|---|---|---|---|---|---|
| G1 | P | B | C | B | C | A | A | A | B | C | Q |
| G2 | P | C | B | C | B | A | A | A | C | B | Q |
| G3 | P | B | C | B | C | A | A | A | B | C | Q |

As shown in the table above, the backward flow provide request A is transmitted to the groups G1 to G3 in the daytime (from 12 to 15 o'clock) when the consumed power reaches a peak. In preparation for this, during the nighttime (0 to 7 o'clock), the charge request P is transmitted to the groups G1 to G3. In the morning (8 to 12 o'clock) and in the afternoon (15 to 17 o'clock), the backward flow approval B and the backward flow disapproval C are rotated so that the groups G1 and G3 can have a different rotation from the group G2.

(Advantageous Effects)

According to the modification of the first embodiment, each group G includes the variation-type customer 30*a* and the stable-type customer 30*b*. Therefore, even if a weather change occurs, each group G can stably provide the backward flow power to the power distribution system 50 from the stable-type customer 30*b*.

In addition, the customers 30 are grouped so that the total rated output power of the two groups G1 and G3 may be substantially equal to the total rated output power of the group G2. The backward flow approval B and the backward flow disapproval C are rotated so that the groups G1 and G3 can have a different rotation from the group G2. Therefore, the amounts of backward flow are fairly distributed among the groups G.

[Second Embodiment]

Next, a second embodiment of the present invention will be described. In the second embodiment, descriptions will be given for the case where the output power of a power supply device 32 provided to each customer 30 reaches a peak in the daytime. In such a case, the voltage of a power distribution system 50 might rise excessively, and hence reducing the backward flow power and increasing the forward flow power in the daytime are desired.

Hereinafter, descriptions are given mainly on the different points from the aforementioned first embodiment. Specifically, what are instructed by the first and second adjustment instructions is rotated differently in the second embodiment. An example of what are instructed by the first and second adjustment instructions transmitted from a substation 20 to the groups G will be described using the table below.

In the table below, the first adjustment instruction includes the backward flow approval B, the backward flow disapproval C, and the forward flow receive request D, and the second adjustment instruction includes only the discharge request Q. The forward flow receive request D requests an increase of the amount of forward flow, and is included in the first adjustment instruction along with the backward flow disapproval C. Note that forward flow power information indicating the forward flow power may be included in the first adjustment instruction.

TABLE 3

| INSTRUCTION | TIME 0-7 2nd | 8-9 1st | 9-10 1st | 10-11 1st | 11-12 1st | 12-13 1st | 13-14 1st | 14-15 1st | 15-16 1st | 16-24 2nd |
|---|---|---|---|---|---|---|---|---|---|---|
| G1 | Q | B | B | C + D | C + D | C + D | B | B | C + D | Q |
| G2 | Q | B | C + D | C + D | B | C + D | C + D | B | B | Q |
| G3 | Q | B | B | B | C + D | C + D | C + D | C + D | B | Q |

As shown in the table above, from the morning until the early evening (8 to 16 o'clock), the backward flow approval B and the backward flow disapproval C are transmitted while being rotated among the groups G1 to G3 so that the groups G1 to G3 can provide the backward flow equally.

In the daytime when the output power reaches a peak (10 to 14 o'clock), the backward flow disapproval C is transmitted to two or more groups G out of the three groups G in order to suppress a voltage rise of the power distribution system 50. Moreover, the forward flow receive request D is transmitted along with the backward flow disapproval C in order to suppress the voltage rise more effectively by storing the forward flow power in a power storage device 33.

From the early evening until the morning (16 to 7 o'clock), the discharge request Q is transmitted to the groups G1 to G3 in order to increase an available storage capacity of the power storage device 33 in preparation for power storage from the morning until the early evening (8 to 16 o'clock).

Upon receipt of the backward flow approval B in the next time period after receiving the backward flow disapproval C and the forward flow receive request D, a grid interconnection device 100 may preferentially provide the backward flow from the power storage device 33 in order to increase the available storage capacity of the power storage device 33 in preparation for the case of receiving "C+D" in the subsequent next time period. Alternatively, the substation 20 may transmit the backward flow approval B and the discharge request Q in the next time period after transmitting the backward flow disapproval C and the forward flow receive request D. In this case, the grid interconnection device 100 provides the backward flow from the power storage device 33 in accordance with the discharge request Q.

(Operation of Grid Interconnection Device)

Figure 12:
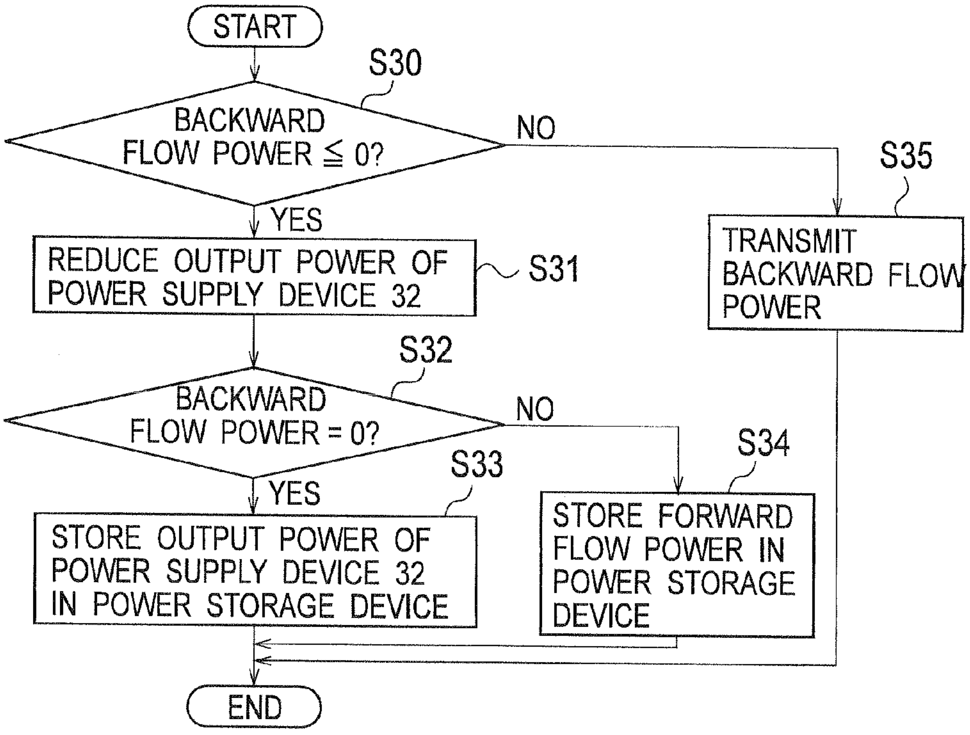
FIG. 12 is a flowchart showing processing of controlling backward flow power by a grid interconnection device 100 according to a second embodiment.

Hereinafter, the operation of the grid interconnection device according to the second embodiment will be described in reference to FIG. 12. FIG. 12 is a flowchart showing processing of controlling the backward flow power by the grid interconnection device 100 according to the second embodiment.

As shown in FIG. 12, in step S30, the grid interconnection device 100 determines if the backward flow power is zero or smaller, by referring to the backward flow power information or forward flow power information included in the first adjustment instruction. If the backward flow power is zero (backward flow disapproval) or smaller than zero (forward flow receive request), the processing moves to step S31. If the backward flow power is larger than zero, the backward flow power is transmitted in step S35 and the processing terminates.

In step S31, the grid interconnection device 100 reduces the output power of the power supply device 32 in order to prevent the available storage capacity of the power storage device 33 from being zero. However, if the customer 30 does not include the power supply device 32, the processing in step S32 is not executed.

In step S32, the grid interconnection device 100 determines if the backward flow power is zero. If the backward flow power is zero, the processing moves to step S33. If the backward flow power is not zero, in other words, if the forward flow power is larger than zero, the processing moves to step S34.

In step S33, the grid interconnection device 100 stores the output power of the power supply device 32 in the power storage device 33. Accordingly, the backward flow power is reduced.

In step S34, the grid interconnection device 100 stores the output power of the power supply device 32 and the forward flow power from the power distribution system 50 in the power storage device 33.

(Advantageous Effects)

In the grid interconnection device 100 according to the second embodiment, the receiver 101 receives the second adjustment instruction transmitted before the first adjustment instruction. The controller 104 controls the power storage amount on the basis of the second adjustment instruction.

Specifically, in the second embodiment, the first adjustment instruction includes the backward flow disapproval C, and the second adjustment instruction is the discharge request Q. Accordingly, the power storage device 33 of each customer 30 can be discharged in advance in preparation for the case where the backward flow power reaches a peak in a particular time period. Therefore, the backward flow power can be reduced down to the desired amount in the particular time period by storing the output power of the power supply device 32 in the power storage device 33 in the particular time period.

In addition, the backward flow approval B and the backward flow disapproval C are rotated among the groups G as shown in Table 3, and thereby the amount of backward flow among the groups G can be equalized.

Moreover, the first adjustment instruction includes the backward flow disapproval C and the forward flow receive request D. Therefore, the voltage rise of the power distribution system 50 is effectively suppressed by storing the forward flow power in the power storage device 33.

[Third Embodiment]

Hereinafter, a third embodiment of the present invention will be described. In the third embodiment, a customer 30 includes a display unit configured to display information on a power control system 1.

Figure 13:
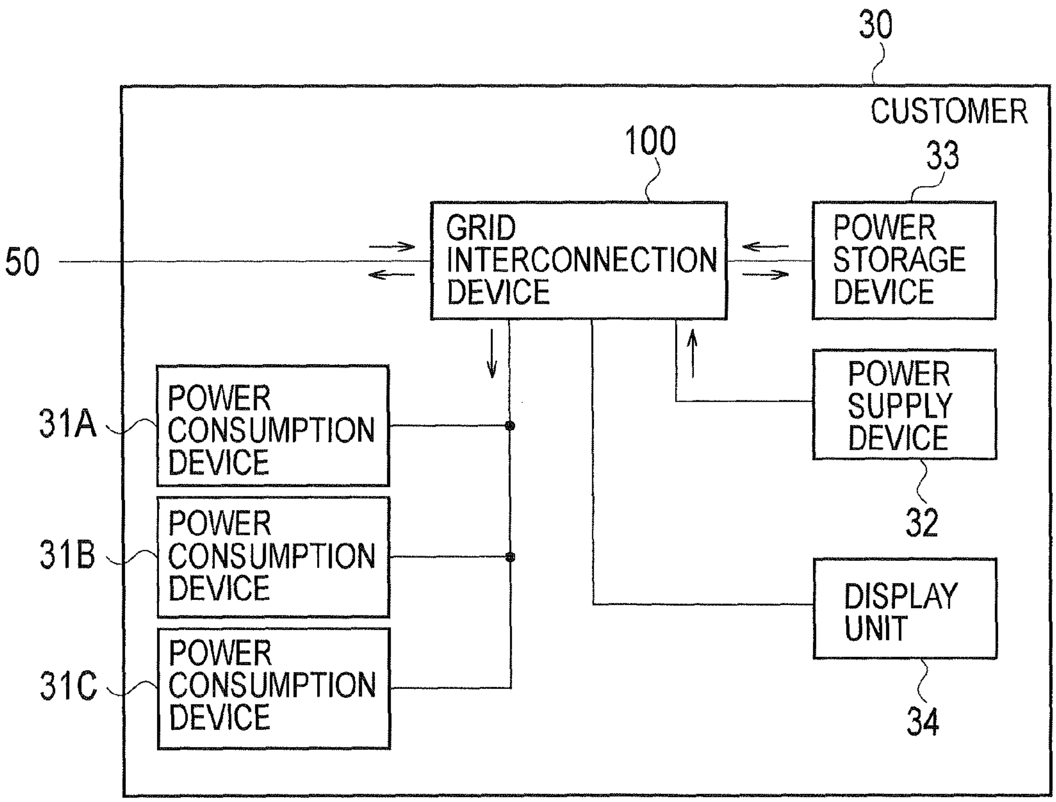
FIG. 13 is a block diagram showing a configuration of a customer 30 according to a third embodiment.

FIG. 13 is a block diagram showing a configuration of the customer 30 according to the third embodiment. As shown in FIG. 13, the customer 30 includes a display unit 34. The display unit 34 is connected to a grid interconnection device 100. Incidentally, the display unit 34 may be provided in the grid interconnection device 100.

Display items of the display unit 34 are, for example, (1) the content of the present adjustment instruction, (2) the content of the next adjustment instruction, (3) information on backward flow power and forward flow power, (4) a remaining time until the next adjustment instruction, (5) statuses of electricity trading, (6) operation statuses of the power distribution system.

Figure 14A:
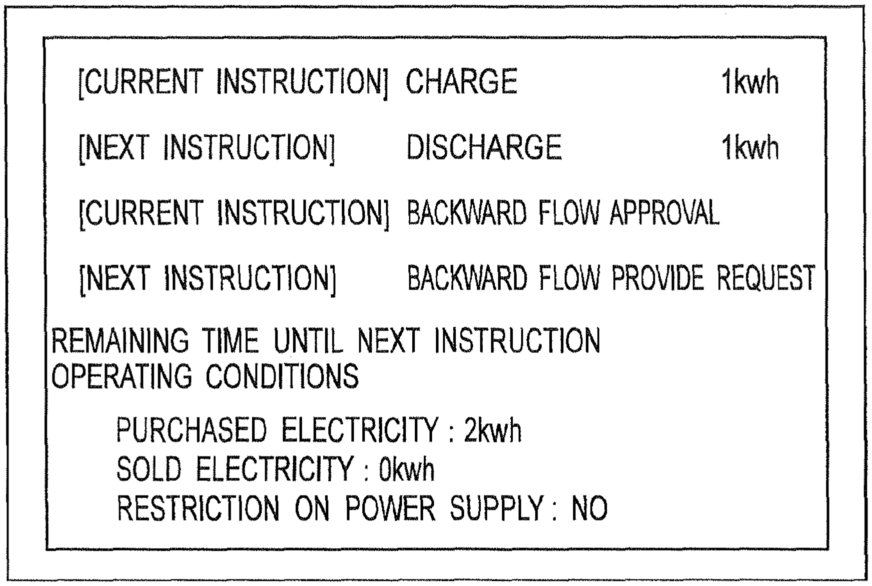
FIGS. 14A and 14B are diagrams showing display examples of a display unit 34 according to the third embodiment.
Figure 14B:
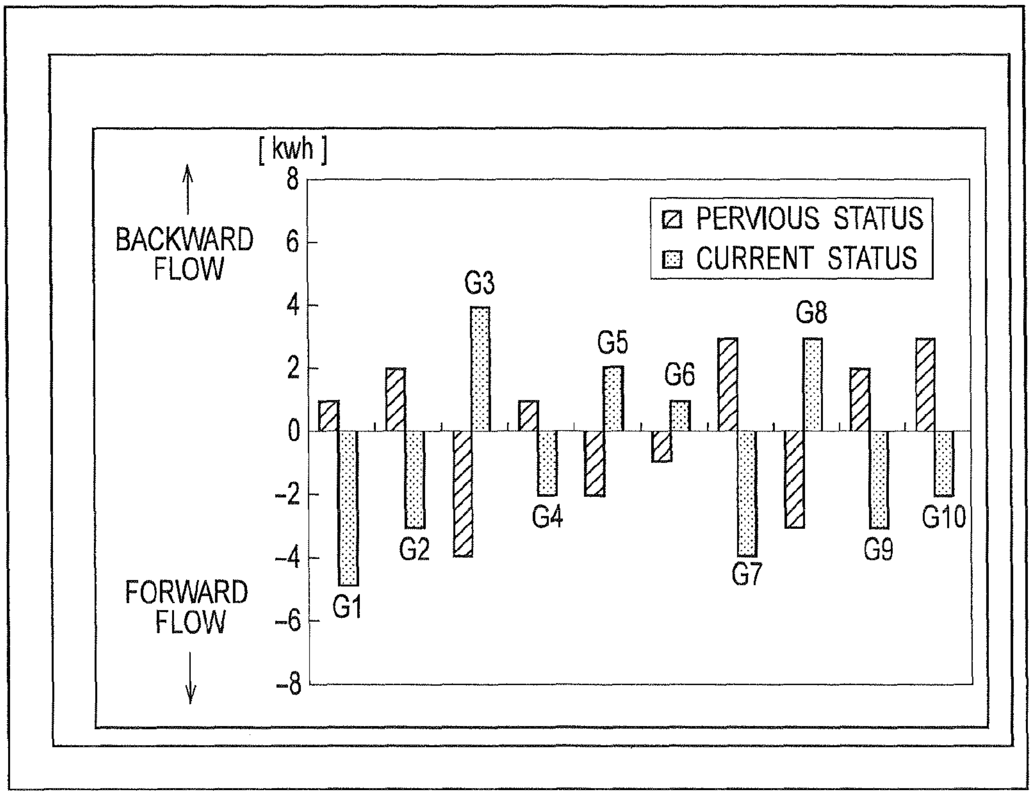

FIGS. 14A and 14B are diagrams showing display examples of the display unit 34. FIG. 14A is a display example showing the display items (1) to (5). FIG. 14B is a display example showing the display item (6). FIG. 14B shows histories of backward flow power and forward flow power of 10 groups G1 to G10 arranged in a power distribution system 50.

A user can check on the operating conditions of his/her own customer by observing the display items (1) to (5) of the display unit 34.

In addition, a user can check if the groups G are given equal opportunity for the backward flow by observing the display item (6) of the display unit 34. In the example of FIG. 14B, the user can check that the group G4 is under the backward flow disapproval whereas the group G3 is under the backward flow approval in the current time period; and that the groups G4 is under the backward flow approval whereas the group G3 is under the backward flow disapproval in the previous time period. Accordingly, the users of the group G3 and the group G4 can observe that the backward flows are equally provided, and thereby can be made more convinced of the fairness in electricity trading.

[Fourth Embodiment]

Hereinafter, a fourth embodiment of the present invention will be described. In the fourth embodiment, the details of the first method explained in the first embodiment will be described.

As described above, the first method is the method of calculating how much amount of backward flow power from each customer 30 should be obtained to resolve a shortage of power, on the basis of a voltage drop tendency (voltage drop range Δv/time duration Δt) in a power distribution system 50, the contract capacity, the rated output power of a power supply device 32, and the power storage capacity of a power storage device 33.

(Configuration of Substation)

Figure 15:
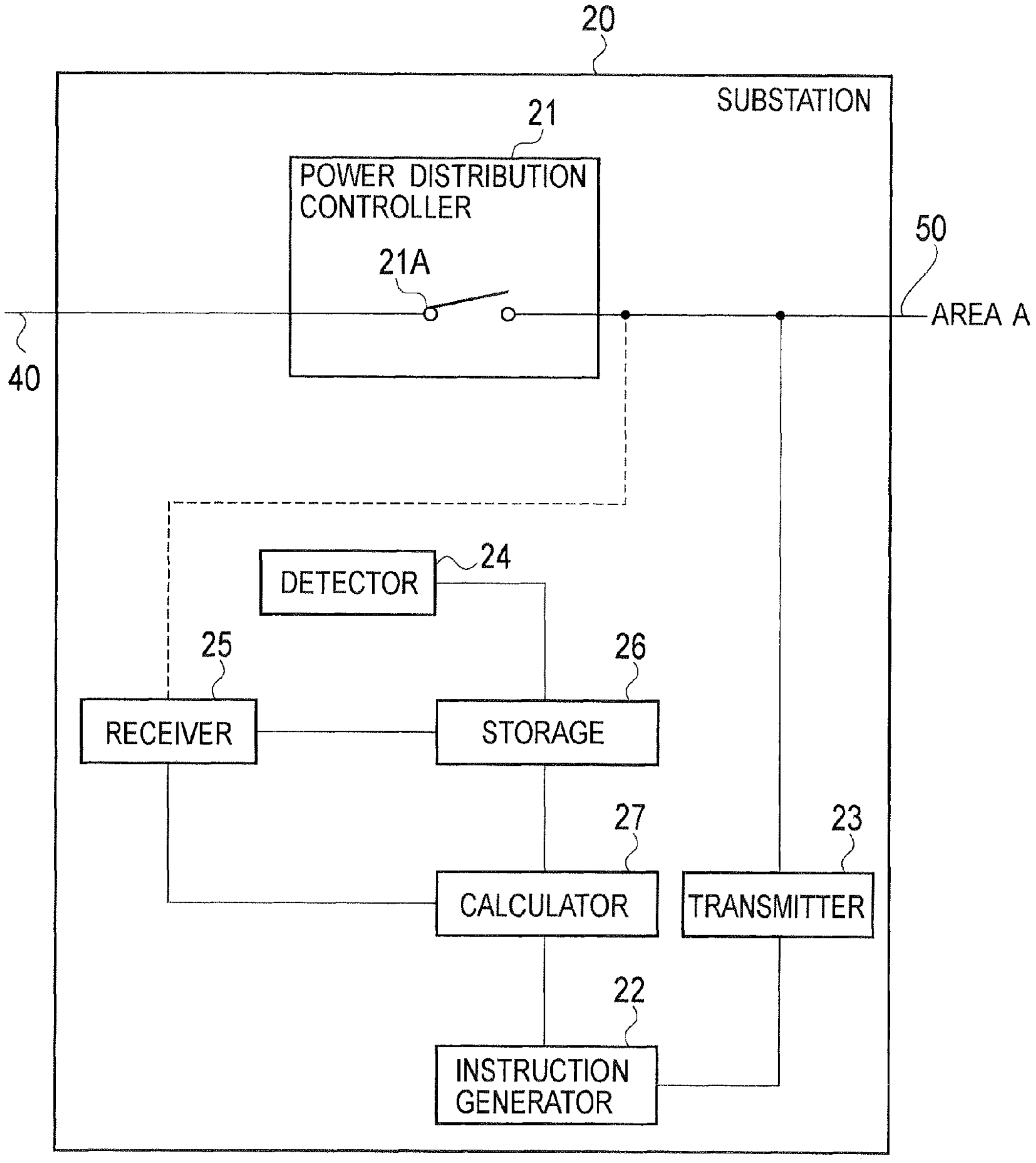
FIG. 15 is a block diagram showing a configuration of a substation 20 according to fourth to seventh embodiments.

FIG. 15 is a block diagram showing a configuration of a substation 20 according to the fourth embodiment. As shown in FIG. 15, the substation 20 includes a detector 24, a receiver 25, a storage 26, and a calculator 27 in addition to a power distribution controller 21, an instruction generator 22, and a transmitter 23 described in the first embodiment.

The detector 24 detects the voltage value of the power distribution system 50 in the substation 20. The voltage value detected by the detector 24 is stored in the storage 26.

The receiver 25 receives measured voltage values at a step voltage regulator (SVR), a pole transformer, and the like that are provided in the power distribution system 50 between the substation 20 and the customers 30. Alternatively, the receiver 25 receives measured voltage values at grid interconnection points at each of which a grid interconnection device 100 of one customer 30 is connected to the power distribution system 50. The voltage values (measured voltage values) received by the receiver 25 are stored in the storage 26.

The storage 26 stores the contact capacity, the rated output power of the power supply device 32, and the power storage capacity of the power storage device 33. For example, at the time of power-receiving contract with each customer 30, or at the time of contract of installing the power supply device 32 and the power storage device 33, the storage 26 can store the contact capacity, the rated output power of the power supply device 32, and the power storage capacity of the power storage device 33 on the basis of information which each customer 30 provides to companies which provide and manage the power distribution system 50 (an owner or an operator of a power network, an operation manager of a power transmission and distribution system).

The calculator 27 calculates how much amount of backward flow power should be obtained to resolve the shortage of power on the basis of a history of the voltage values of the power distribution system 50 that is stored in the storage 26, as well as the contact capacity, the contract capacity, the rated output power of the power supply device 32, and the power storage capacity of the power storage device 33 that are stored in the storage 26. The details of the method of calculating the amount of backward flow power capable of resolving the shortage of power (hereinafter, referred to as a desired amount of backward flow power) will be described later.

The calculator 27 determines an estimated obtainable power amount $W_{get}$ for each customer 30 by use of the desired amount of backward flow power thus calculated.

The instruction generator 22 incorporates the estimated obtainable power amount $W_{get}$ for each customer 30 in the first adjustment instruction as the aforementioned backward flow power information.

The configuration of this embodiment except the point above is the same as the aforementioned first embodiment.

(Calculation Method 1)

The calculator 27 calculates the desired amount of backward flow power in accordance with the following calculation method 1 and/or calculation method 2. First, the calculation method 1 will be described.

The calculator 27 obtains the history of the voltage values of the power distribution system 50, and then calculates a voltage drop tendency (voltage drop range $\Delta v$/time duration $\Delta t$) in the power distribution system 50. The calculator 27 calculates a total estimated consumable power amount $\Sigma W_{cons}$ until a predetermined time, which is an estimated amount of power that may be consumed by all the customers 30, on the basis of the calculated voltage drop tendency.

In addition, the calculator 27 calculates a total estimated obtainable power amount $\Sigma W_{get}$, which is an estimated amount of total backward flow power that may be provided from all the customers 30, on the basis of the contract capacity, the rated output power of the power supply device 32, and the power storage capacity of the power storage device 33 which are stored in the storage 26.

The calculator 27 determines, as the desired amount of backward flow power, the total estimated obtainable power amount $\Sigma W_{get}$ whose difference from the calculated total estimated consumable power amount $\Sigma W_{cons}$ falls within a desired range, and then determines the estimated obtainable power amount $W_{get}$ for each customer 30 by use of the desired amount of backward flow power.

(Calculation Method 2)

Next, a calculation method 2 will be described.

The calculator 27 obtains the history of the voltage values of the power distribution system 50 from the storage 26, and then calculates the voltage drop tendency (voltage drop range $\Delta v$/time duration $\Delta t$) in the power distribution system 50. The calculator 27 calculates time $t_{down}$ required for a voltage value drop to the voltage drop limit value, on the basis of the calculated voltage drop tendency. Here, the voltage drop limit value is a voltage value of the lower limit of a proper voltage range (see FIG. 3) $+\alpha$.

Moreover, the calculator 27 calculates time $t_{get}$ required for a voltage value rise from the voltage drop limit value to the present voltage value when each customer 30 outputs the maximum backward flow power.

Then, the calculator 27 determines time $t_{tune}$ that is necessary to make a difference between the time $t_{down}$ required for a voltage value drop to the voltage drop limit value, and the time $t_{get}$ required for a voltage value rise from the voltage drop limit value to the present voltage value fall within a predetermined range. The calculator 27 regards the amount of backward flow power from each customer 30 during time $t_{tune}$ as a desired amount of backward flow power. The calculator 27 calculates the estimated obtainable power amount $W_{get}$ for each customer 30 from the desired amount of backward flow power.

(Advantageous Effects)

In the substation according to the fourth embodiment, the calculator 27 calculates the desired amount of backward flow power on the basis of the history of the voltage values of the power distribution system 50, and then calculates the estimated obtainable power amount $W_{get}$ for each customer 30 from the desired amount of backward flow power. The instruction generator 22 generates the first adjustment instruction including the backward flow power information indicating the estimated obtainable power amount $W_{get}$ calculated by the calculator 27. This allows an appropriate calculation of the desired amount of backward flow power, and thus the shortage of power is resolved during a time period when the consumed power reaches a peak.

[Fifth Embodiment]

Hereinafter, a fifth embodiment of the present invention will be described. In the fifth embodiment, descriptions will be given for a case 1 of the second method described in the first embodiment.

The case 1 of the second embodiment is a method of calculating a desired amount of backward flow power in consideration of weather conditions on the day (real-time data, forecast data, and the like), and season, time and calendar information.

(Configuration of Substation)

A configuration of the substation 20 according to the fifth embodiment will be described with reference to FIG. 15.

The receiver 25 or the detector 24 in the substation 20 obtains any one of the following data as weather observation data:

- pinpoint weather forecast data in an area where the substation 20 is located;
- weather observation data at the substation 20;
- weather observation data at a step voltage regulator (SVR), a pole transformer, and the like arranged in the power distribution system 50 between the substation 20 and the customers 30; and
- weather observation data at each grid interconnection point where the grid interconnection device 100 and each power distribution system 50 area connected.

Note that the "area where the substation 20 is located," which is targeted for the pinpoint weather forecast data may include an area where the power distribution system 50 under the management of the substation 20 and/or each customer 30 are located Moreover, the receiver 25 of the substation 20 receives the season, time and calendar information through data broadcasting (digital broadcasting, BS broadcasting, CS broadcasting, CATV, and the like), a radio clock, or the Internet. Alternatively, the receiver 25 may obtain the season, time and calendar information by use of a built-in timer (not shown) of the substation 20.

Figure 16:
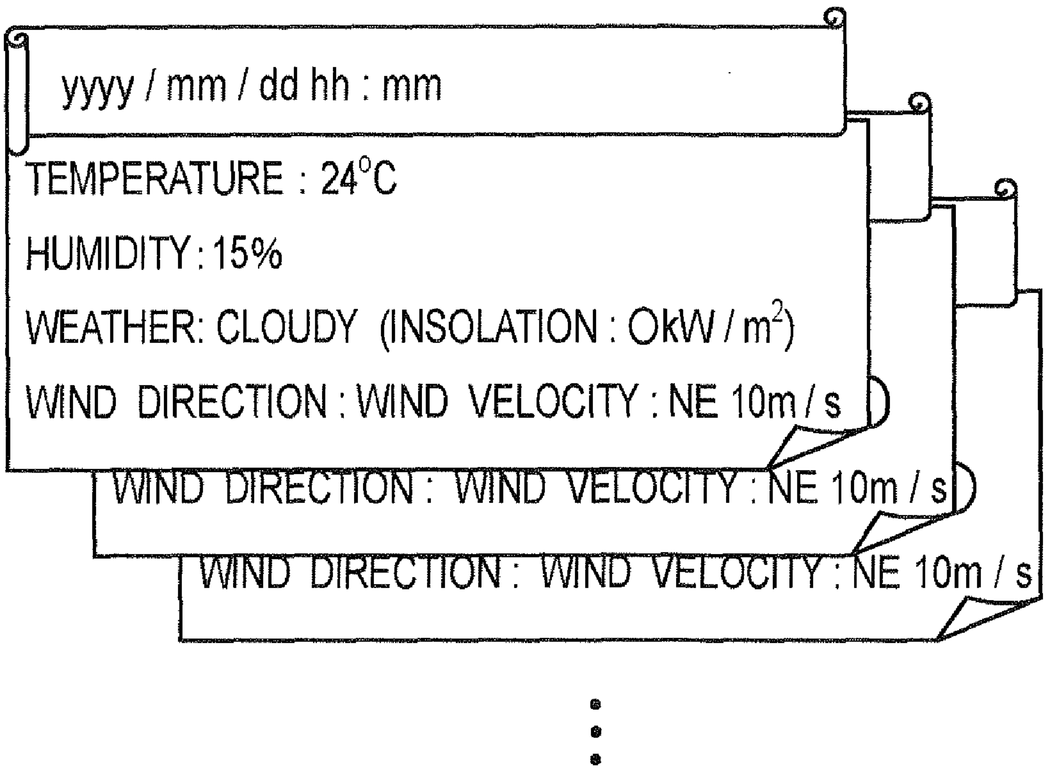
FIG. 16 is a diagram showing an example of data stored in a storage 26 according to the fourth embodiment.

The storage 26 cumulatively stores weather observation data having the time and calendar information added thereto as shown in FIG. 16. In the example of FIG. 16, the weather observation data includes items of temperature, humidity, weather, wind direction, and wind velocity.

The storage 26 stores the contract capacity, the rated output power of the power supply device 32, and the power storage capacity of the power storage device 33. For example, at the time of power-receiving contract with each customer 30, or at the time of contract of installing the power supply device 32 and the power storage device 33, the storage 26 can store the contact capacity, the rated output power of the power supply device 32, and the power storage capacity of the power storage device 33 on the basis of information which each customer 30 provides to companies (a power company and the like) which provide and manage the power distribution system 50 (an owner or an operator of a power network, an operation manager of a power transmission and distribution system).

The calculator 27 calculates the desired amount of backward flow power on the basis of the history of the weather observation data, the contact capacity, the rated output power of the power supply device 32, and the power storage capacity of the power storage device 33, which are stored in the storage 26. The details of methods of calculating the desired amount of backward flow power will be described later.

(Calculation Method)

Figure 17:
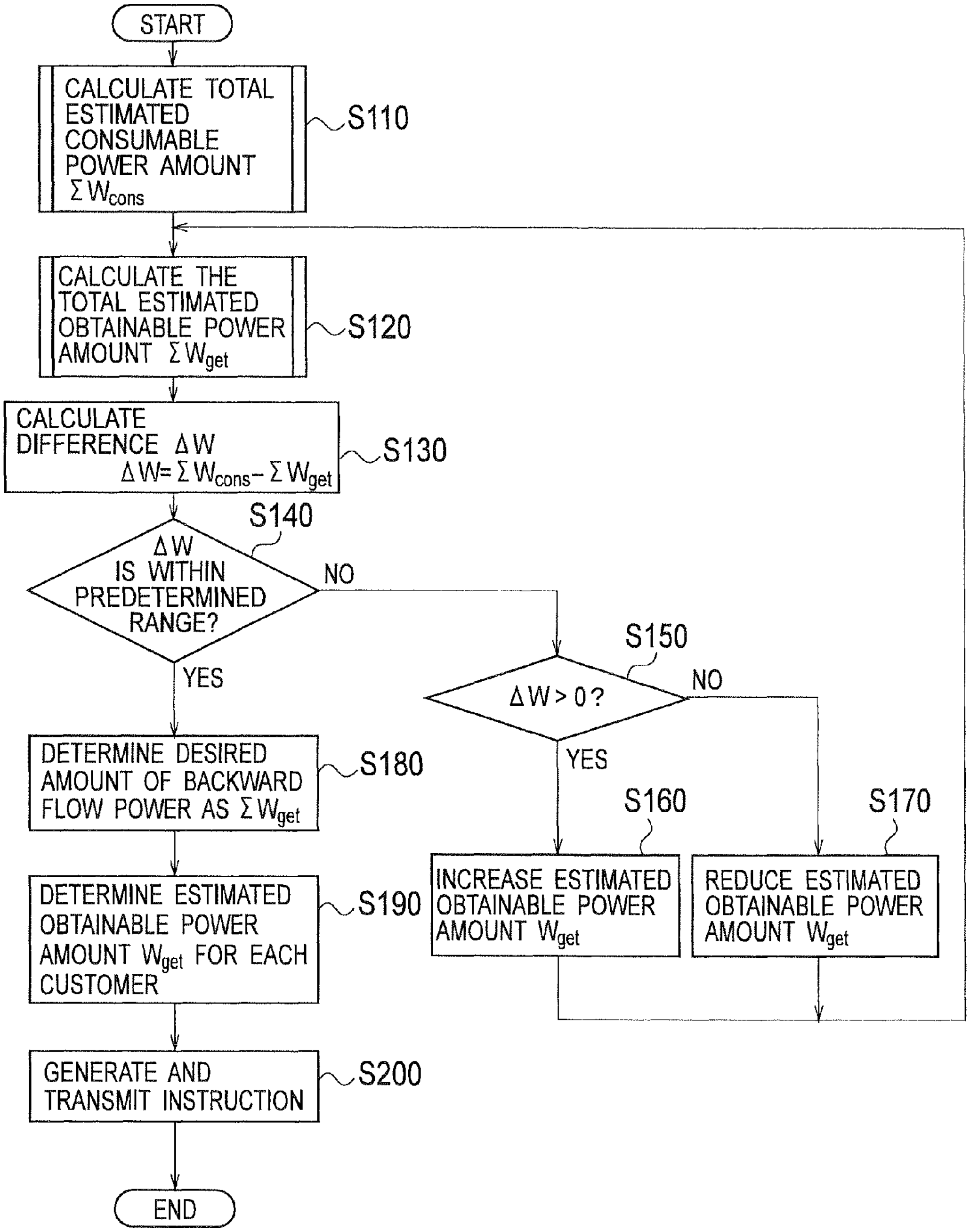
FIG. 17 is a flowchart showing an operation of calculating a desired amount of backward flow power in the substation 20 according to the fifth embodiment.

FIG. 17 is a flowchart showing an operation of calculating the desired amount of backward flow in the substation 20 according to the fifth embodiment.

In step S110, the calculator 27 calculates the total estimated consumable power amount $\Sigma W_{cons}$.

In step S120, the calculator 27 calculates the total estimated obtainable power amount $\Sigma W_{get}$.

In step S130, the calculator 27 calculates the difference $\Delta W$ between the calculated total estimated consumable power amount $\Sigma W_{cons}$ and the calculated total estimated obtainable power amount $\Sigma W_{get}$.

If the difference $\Delta W$ is out of a predetermined range (step S140: NO) and is larger than zero (step S150: YES), the calculator 27 performs processing for increasing the estimated obtainable power amount $W_{get}$ in step S160 in order to resolve the shortage of the amount of backward flow power. Specifically, the calculator 27 increases the estimated obtainable power amount $W_{get}$ by changing the type of the power supply device 32 to a type "having the rated output power larger than a predetermined value" or "a reliable supply type," or by increasing the output of the power storage device 33.

If the difference $\Delta W$ is out of the predetermined range (step S140: NO) and is zero or smaller (step S150: NO), the calculator 27 performs processing for reducing the estimated obtainable power amount $W_{get}$ in step S170 in order to resolve excess of the amount of backward flow power. Specifically, the calculator 27 reduces the estimated obtainable power amount $W_{get}$ for any one of the customers 30.

When step S160 or step S170 is completed, the processing returns to step S120.

On the other hand, if the difference $\Delta W$ is within the predetermined range (step S140: YES), the calculator 27 determines the total estimated obtainable power amount $\Sigma W_{get}$ calculated in step S120 as the desired amount of backward flow power in step S180.

In step S190, the calculator 27 determines the estimated obtainable power amount $W_{get}$ for each customer 30 by use of the desired amount of backward flow power determined in step S180.

In step S200, the instruction generator 22 generates the first adjustment instruction on the basis of the estimated obtainable power amount $W_{get}$ for each customer 30 determined in step S190, and the transmitter 23 transmits the generated first adjustment instruction.

Figure 18:
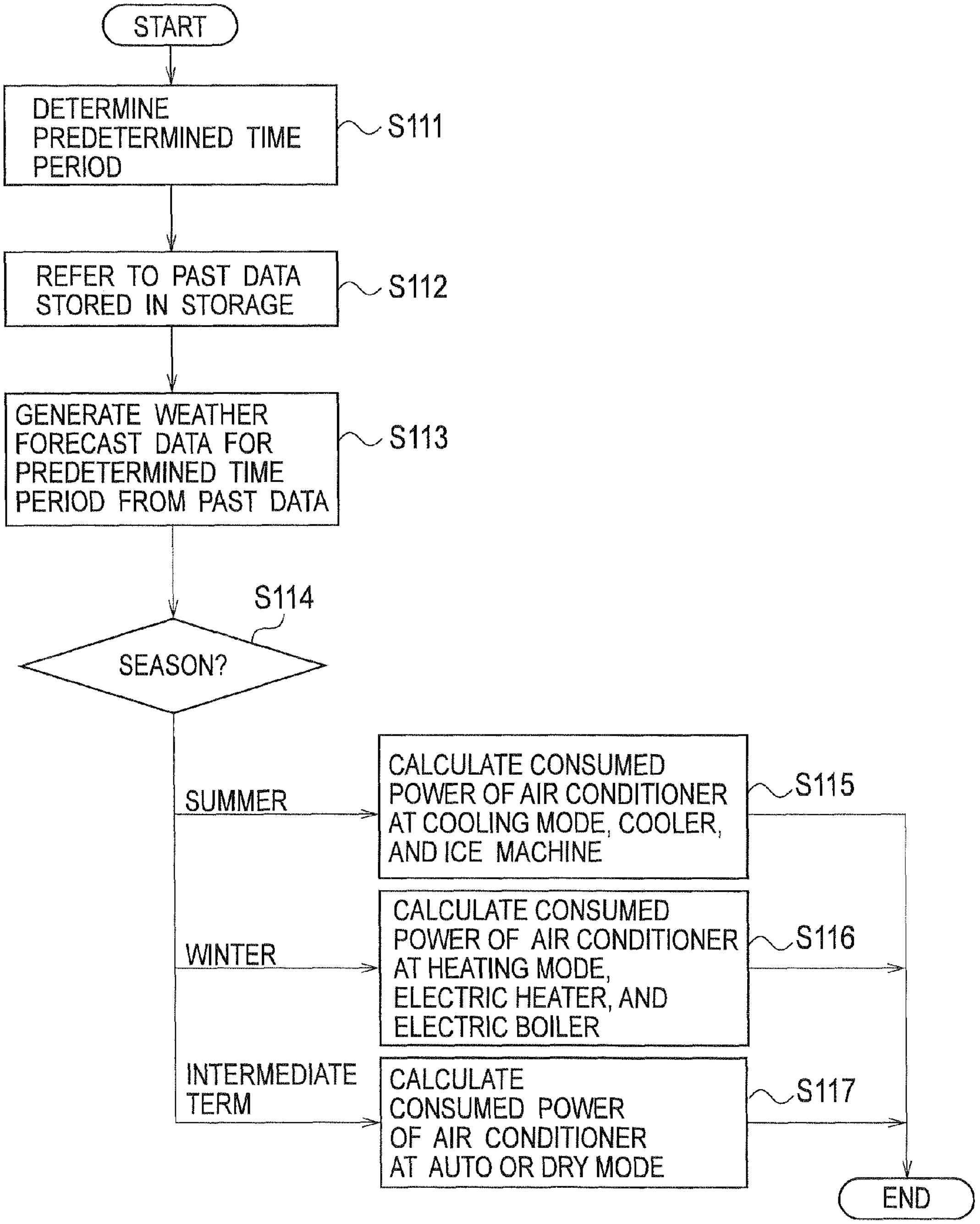
FIG. 18 is a flowchart showing details of step S110 in FIG. 17.

Next, details of the processing of calculating the total estimated consumable power amount $\Sigma W_{cons}$ (step S110 in FIG. 17) will be described. FIG. 18 is a flowchart showing the details of step S110 in FIG. 17. The flow in FIG. 18 is performed for each customer 30.

In step S111, the calculator 27 determines a predetermined time period targeted for calculating the desired amount of backward flow power.

In step S112 or step S113, the calculator 27 generates the weather forecast data for the predetermined time period by referring to the history of the weather observation data stored in the storage 26.

As for the way of generating the weather observation data, the calculator 27 can read out from the storage 26 the weather observation data for several hours before the predetermined time period, and generate the weather forecast data by deriving a tendency of weather changes. Alternatively, the calculator 27 can read out from the storage 26 the weather observation data for the predetermined time period in the past several years and generate the weather forecast data by use of the read-out weather observation data in the past several years.

Note that, if the weather forecast data are transmitted through TV broadcasting, data broadcasting, CS broadcasting, the internet, dedicated lines, or the like, the receiver 25 may obtain the weather forecast data for the predetermined time period by receiving the transmitted weather forecast data.

In steps S114 to S117, the calculator 27 calculates an estimated consumable power amount $W_{cons}$ of the customer 30 on the basis of the weather forecast data for the predetermined time period and the contract capacity of the customer 30 stored in the storage 26.

For example, if the season is summer (June to September), in step S115 the calculator 27 calculates consumed power of an air conditioner at cooling mode, a cooler, and ice machine and so on as the estimated consumable power amount $W_{cons}$, from the difference between the weather forecast data (temperature and humidity) for the predetermined time period and a set temperature and a set humidity.

If the season is winter (December to February), in step S116 the calculator 27 calculates consumed power of an air conditioner at heating mode, an electric heater, an electric boiler and so on as the estimated consumable power amount $W_{cons}$, from the difference between the weather forecast data (temperature and humidity) for the predetermined time period and a set temperature and a set humidity.

If the season is an intermediate term (March to May, October, and November), in step S117 the calculator 27 calculates consumed power of such as an air conditioner at auto mode or at dry mode as the estimated consumable power amount $W_{cons}$, from the difference between the weather forecast data (temperature and humidity) for the predetermined time period and a set temperature and a set humidity.

The calculator 27 calculates the total estimated consumable power amount $\Sigma W_{cons}$ by adding up the estimated consumable power amounts $\Sigma W_{cons}$ for all the customers 30.

Figure 19:
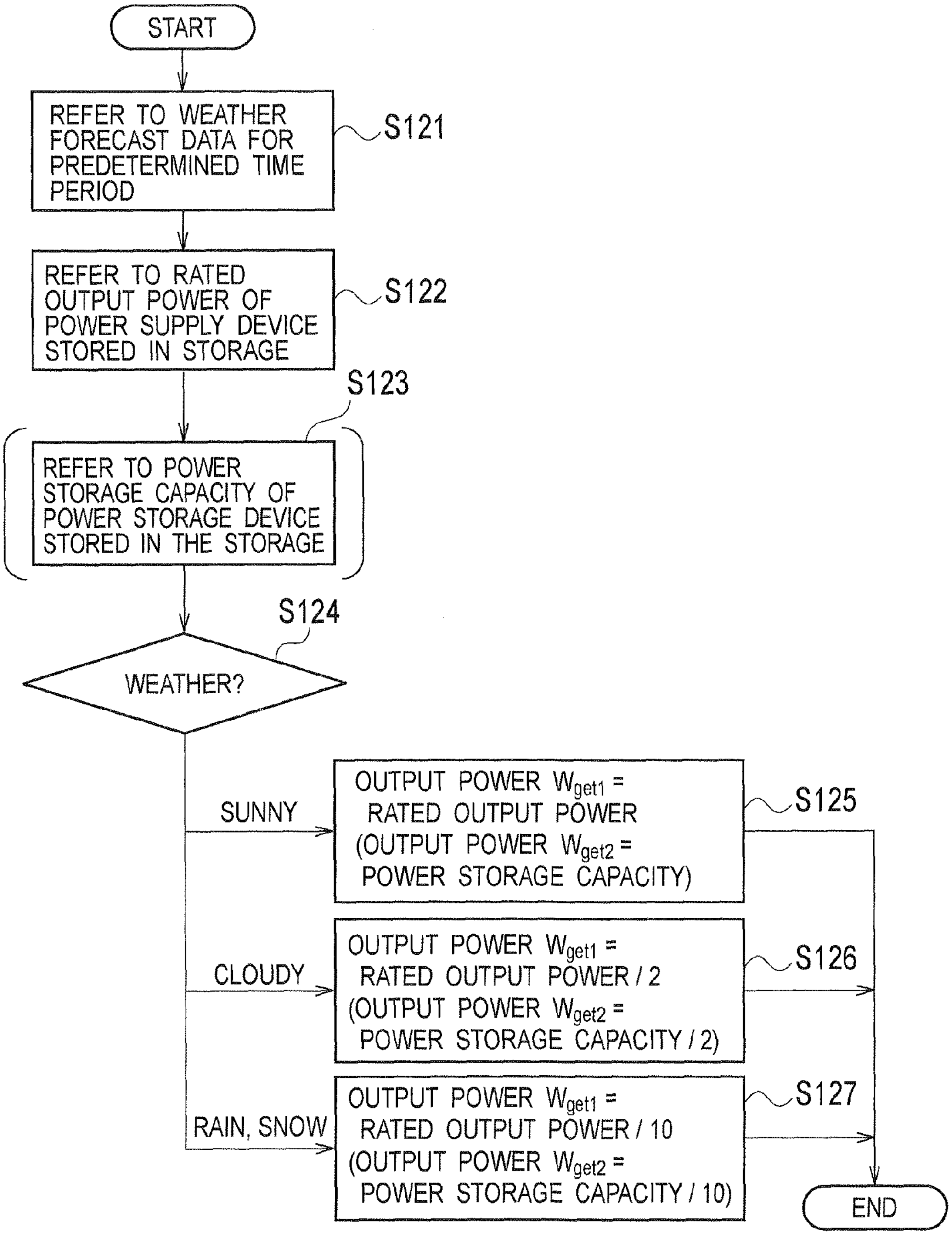
FIG. 19 is a flowchart showing details of step S120 in FIG. 17.

Next, the processing of calculating the total estimated obtainable power amount $\Sigma W_{get}$ (details of step S120 in FIG. 17) will be described. FIG. 19 is a flowchart showing the details of step S120 in FIG. 17. A flow in FIG. 19 is performed for each customer 30.

In step S121, the calculator 27 refers to the weather forecast data for the predetermined time period, which is generated in step S113 in FIG. 18.

In step S122, the calculator 27 refers to the rated output power of the power supply device 32, which is stored in the storage 26.

In step S123, the calculator 27 refers to the power storage capacity of the power storage device 33, which is stored in the storage 26.

In steps S124 to 5127, the calculator 27 calculates the estimated consumable power amount $W_{cons}$ of the customer 30 on the basis of the weather forecast data for the predetermined time period, the rated output power of the power supply device 32, and the power storage capacity of the power storage device 33.

For example, if the power supply device 32 is a photovoltaic power generator and the amount of insolation shown by the weather forecast data is large (namely, "sunny"), the calculator 27 sets output power $W_{get1}$ of the power supply device 32 of the customer 30 to the rated output power in step S125. If the customer 30 includes the power storage device 33, the calculator 27 sets output power $W_{get2}$ of the power storage device 33 of the customer 30 to the power storage capacity.

If the power supply device 32 is the photovoltaic power generator and the amount of insolation shown by the weather forecast data is approximately half of the maximum amount (namely, "cloudy"), the calculator 27 sets the output power $W_{get1}$ of the power supply device 32 of the customer 30 to half of the rated output power in step S126. If the customer 30 includes the power storage device 33, the calculator 27 sets the output power $W_{get2}$ of the power storage device 33 of the customer 30 to half of the power storage capacity. This is because the charge request is already made by the second adjustment instruction, and the amount of insolation shown by the weather forecast data is approximately half of the maximum amount ("cloudy").

If the power supply device 32 is the photovoltaic power generator and the amount of insolation shown by the weather forecast data is small (namely, "rainy or snowy"), the calculator 27 sets the output power $W_{get1}$ of the power supply device 32 of the customer 30 to one tenth of the rated output power in step S127. If the customer 30 includes the power storage device 33, the calculator 27 sets the output power $W_{get2}$ of the power storage device 33 of the customer 30 to one tenth of the power storage capacity.

Then, the estimated obtainable power amount $W_{get}$ of the customer 30 is equal to $W_{get1}+W_{get2}$ obtained in the above way.

The calculator 27 calculates the total estimated consumable power amount $\Sigma W_{cons}$ by adding up the estimated obtainable power amounts $W_{get}$ for all the customers 30.

In this operation flow, the power storage capacity of the power storage device 33 is considered. However, the estimated obtainable power amount $W_{get}$ may be calculated based on the rated output power of the power supply device 32 without considering the power storage capacity of the power storage device 33.

In this example, the amount of insolation in the cloudy weather is assumed as half of the maximum amount, and the amount of insolation in the rainy or snowy weather is assumed as one tenth of the maximum amount. However, these amounts of insolation are merely examples, and may be set to different values.

(Advantageous Effects)

In the substation 20 according to the fifth embodiment, the calculator 27 calculates the desired amount of backward flow power on the basis of weather conditions, and calculates the estimated obtainable power amount $W_{get}$ for each customer 30, from the desired amount of backward flow power. The instruction generator 22 generates the first adjustment instruction including the backward flow power information that indicates the estimated obtainable power amount $W_{get}$ calculated by the calculator 27. Accordingly, the desired amount of backward flow power can be properly calculated, and the shortage of power can be resolved in the time period when the consumed power reaches a peak.

[Modification of Fifth Embodiment]

Hereinafter, a modification of the fifth embodiment of the present invention will be described. In the modification of the fifth embodiment, descriptions will be given for a case 2 of the second method described in the first embodiment.

The case 2 of the second method is a method of calculating a desired amount of backward flow power in consideration of the presence or absence of: an event such as a sportscast (an increase in power consumption by using power consumption devices such as an air conditioner and a television set in the customer for watching of a live high school baseball broadcast in midsummer, an Olympic games broadcast, and the like); or an event in a power distribution system 50 (an increase in power consumption at a venue for a concert or the like and neighboring facilities).

(Configuration of Substation)

A configuration of the substation 20 according to the modification of the fifth embodiment will be described with reference to FIG. 15. Here, descriptions will be given for different points from the fifth embodiment.

The receiver 25 of the substation 20 receives, as event information of a sportscast or the like, program listings for digital broadcasting, program listings for the internet, the internet information on event facilities within a coverage area of the power distribution system 50, or data broadcasting through CATV, for example.

(Calculation Method)

Figure 20:
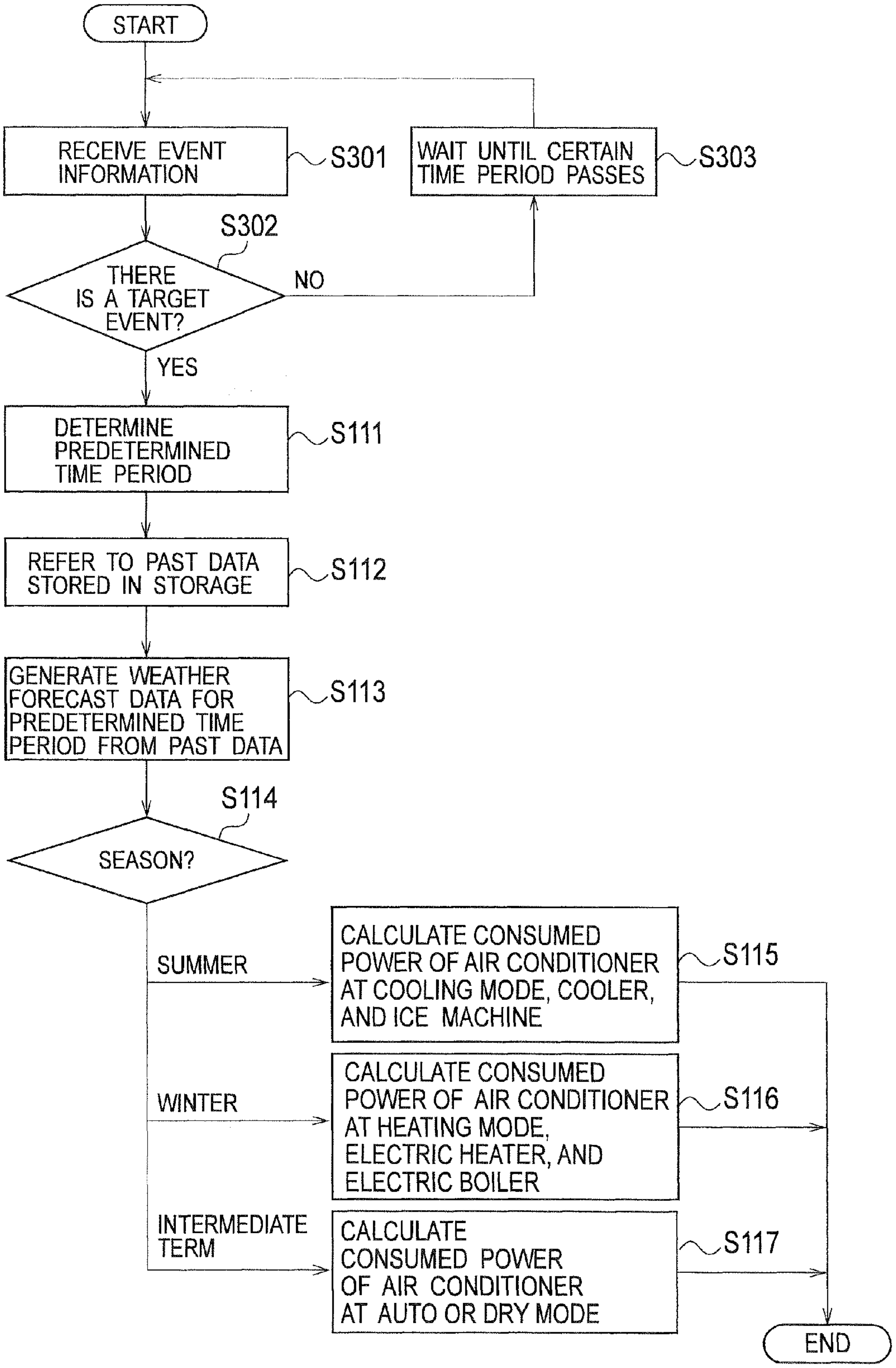
FIG. 20 is a flowchart showing a method of calculating a total estimated consumable power amount $\Sigma W_{cons}$ according to the fifth embodiment.

In this modification, the method of calculating the total estimated consumable power amount $\Sigma W_{cons}$ is different from that in the fifth embodiment. FIG. 20 is a flowchart showing a method of calculating the total estimated consumable power amount $\Sigma W_{cons}$ according to the modification of the fifth embodiment. The flow in FIG. 20 is performed for each customer 30.

In step S301, the receiver 25 receives, as the event information of a sportscast or the like, program listings for digital broadcasting, program listings for the internet, the internet information on event facilities within a coverage area of the power distribution system 50, or data broadcasting through CATV, for example.

In step S302, the calculator 27 checks whether or not there a target event in the event information received by the receiver 25. Here, the target event is an event that influences the total estimated consumable power amount $\Sigma W_{cons}$, and that is represented by Olympic games broadcast in the summer, and the like. Information for specifying the target event may be stored in advance in the storage 26, for example.

If there is a target event (step S302: YES), the processing moves to step S111. If there is no target event (step S302: NO), the processing is held in a wait condition for a certain time period in step S303, and then returns to step S301.

The processing after this is the same as the processing in steps S111 to S117 in FIG. 18.

(Advantageous Effects)

In the substation 20 according to the modification of the fifth embodiment, the calculator 27 calculates the desired amount of backward flow power on the basis of a predetermined event, and calculates the estimated obtainable power amount $W_{get}$ for each customer 30, from the desired amount of backward flow power. The instruction generator 22 generates the first adjustment instruction including the backward flow power information indicating the estimated obtainable power amount $W_{get}$ calculated by the calculator 27. Accordingly, the desired amount of backward flow power can be properly calculated, and the shortage of power can be resolved in the time period when the consumed power reaches a peak.

[Sixth Embodiment]

Hereinafter, a sixth embodiment of the present invention will be described. In the sixth embodiment, descriptions will be given for details of the third method described in the first embodiment.

The third method is a method of calculating how much amount of backward flow power from the customer 30 should be obtained to resolve the shortage of power, on the basis of the amount of forward flow/backward flow calculated from, for example, the type and the rated output power of the power supply device 32 provided to each customer 30, in addition to the weather conditions on the day mentioned in the second method.

A configuration of the substation 20 according to the sixth embodiment will be described with reference to the FIG. 15.

The receiver 25 or the detector 24 obtains the weather observation data as described above.

The receiver 25 of the substation 20 receives season, time and calendar information through data broadcasting (digital broadcasting, BS broadcasting, CS broadcasting, CATV, and the like), a radio clock, or the internet. Alternatively, the receiver 25 may obtain the season, time and calendar information by use of a built-in timer (not shown) of the substation 20.

The storage 26 cumulatively stores weather observation data having time and calendar information added thereto as shown in FIG. 16. In the example of FIG. 16, the weather observation data includes items of temperature, humidity, weather, wind direction, and wind velocity.

The storage 26 stores the type and the rated output power of the power supply device 32 of each customer 30. For example, at the time of power-receiving contract, or at the time of contract of installing the power supply device 32 and the power storage device 33, the storage 26 can store the type and the rated output power of the power supply device 32 of each customer 30 on the basis of information which each customer 30 provides to companies (a power company and the like) which provide and manage the power distribution system 50.

The calculator 27 calculates the estimated consumable power amount $W_{cons}$ for each customer 30 from a history of the weather observation data stored in the storage 26, and then calculates the total estimated consumable power amount $\Sigma W_{cons}$. The calculator 27 calculates the estimated obtainable power amount $W_{get}$ from the type and the rated output power of the power supply device 32 of each customer 30, which are stored in the storage 26, and then calculates the total estimated obtainable power amount $\Sigma W_{get}$ for each customer 30.

Then, the calculator 27 calculates, as the desired amount of backward flow power, the total estimated obtainable power amount $\Sigma W_{get}$ whose difference from the total estimated consumable power amount $\Sigma W_{cons}$ falls within the desired range and then calculates the estimated obtainable power amount $W_{get}$ for each customer 30.

[Seventh Embodiment]

Hereinafter, a seventh embodiment of the present invention will be described. In the seventh embodiment, descriptions will be given for details of the fourth method described in the first embodiment.

The fourth method is a method of calculating how much amount of backward flow power from the customer 30 should be obtained to resolve the shortage of power, on the basis of the amount of forward flow/backward flow calculated from, for example, the forecast information derived from the past power usage history or the like and the type and the rated output power of the power supply device 32 provided to each customer 30, as described above.

(Configuration of Substation)

A configuration of the substation 20 according to the seventh embodiment will be described with reference to FIG. 15.

The receiver 25 receives data on power usage amount of each customer 30. For example, the receiver 25 receives power data of an electricity meter (a smart meter, and the like) of each customer 30. The detector 24 detects the power usage amount of each customer 30 from a power state of the power distribution system 50.

The storage 26 cumulatively stores the data of the power usage amount obtained by the receiver 25 and/or the detector 24.

In addition, the storage 26 stores the type and the rated output power of the power supply device 32 of each customer 30. For example, at the time of power-receiving contract, or at the time of contract of installing the power supply device 32 and the power storage device 33, the storage 26 can store the type and the rated output power of the power supply device 32 of each customer 30 on the basis of information which each customer 30 provides to companies (a power company and the like) which provide and manage the power distribution system 50.

The calculator 27 predicts data transitions from a history of the power usage amounts stored in the storage 26, thereby calculates the estimated consumable power amount $W_{cons}$ for each customer 30, and then calculates and the total estimated consumable power amount $\Sigma W_{cons}$. The calculator 27 calculates the estimated obtainable power amount $W_{get}$ for each customer 30 from the type and the rated output power of the power supply device 32 of the customer 30 stored in the storage 26, and then calculates the total estimated obtainable power amount $\Sigma W_{get}$.

Then, the calculator 27 calculates, as the desired amount of backward flow power, the total estimated obtainable power amount $\Sigma W_{get}$ whose difference from the total estimated consumable power amount $\Sigma W_{cons}$ falls within the predetermined range, and then calculates the estimated obtainable power amount $W_{get}$ for each customer 30.

(Calculation Method)

In the seventh embodiment, the overall flow of the method of calculating the desired amount of backward flow power is the same as that of the fifth embodiment (FIG. 17). However, the methods of calculating the total estimated consumable power amount $\Sigma W_{cons}$ and the total estimated obtainable power amount $\Sigma W_{get}$ are different from those of the fifth embodiment.

Figure 21:
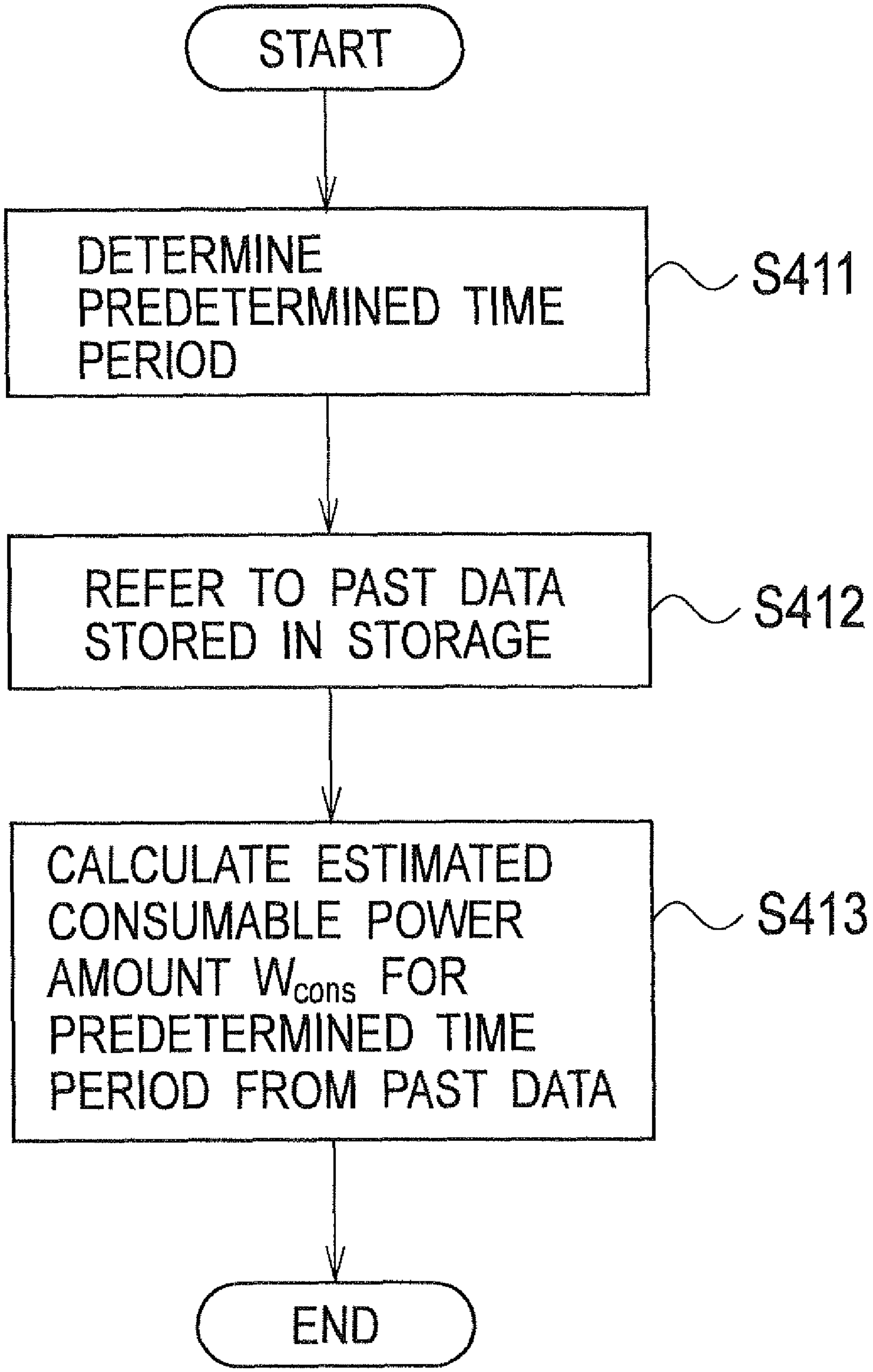
FIG. 21 is a flowchart showing a method of calculating the total estimated consumable power amount $\Sigma W_{cons}$ according to the seventh embodiment.

FIG. 21 is a flowchart showing a method of calculating the total estimated consumable power amount $\Sigma W_{cons}$ according to the seventh embodiment. The flow in FIG. 21 is performed for each customer 30.

In step S411, the calculator 27 determines a predetermined time period targeted for calculation of a desired amount of backward flow power.

In steps S412 and S413, the calculator 27 refers to the history of the power usage amount stored in the storage 26, and calculates the estimated consumable power amount $W_{cons}$ for the predetermined time period.

The calculator 27 calculates the total estimated consumable power amount $\Sigma W_{cons}$ by adding up the estimated consumable power amount $W_{cons}$ for all the customers 30.

Figure 22:
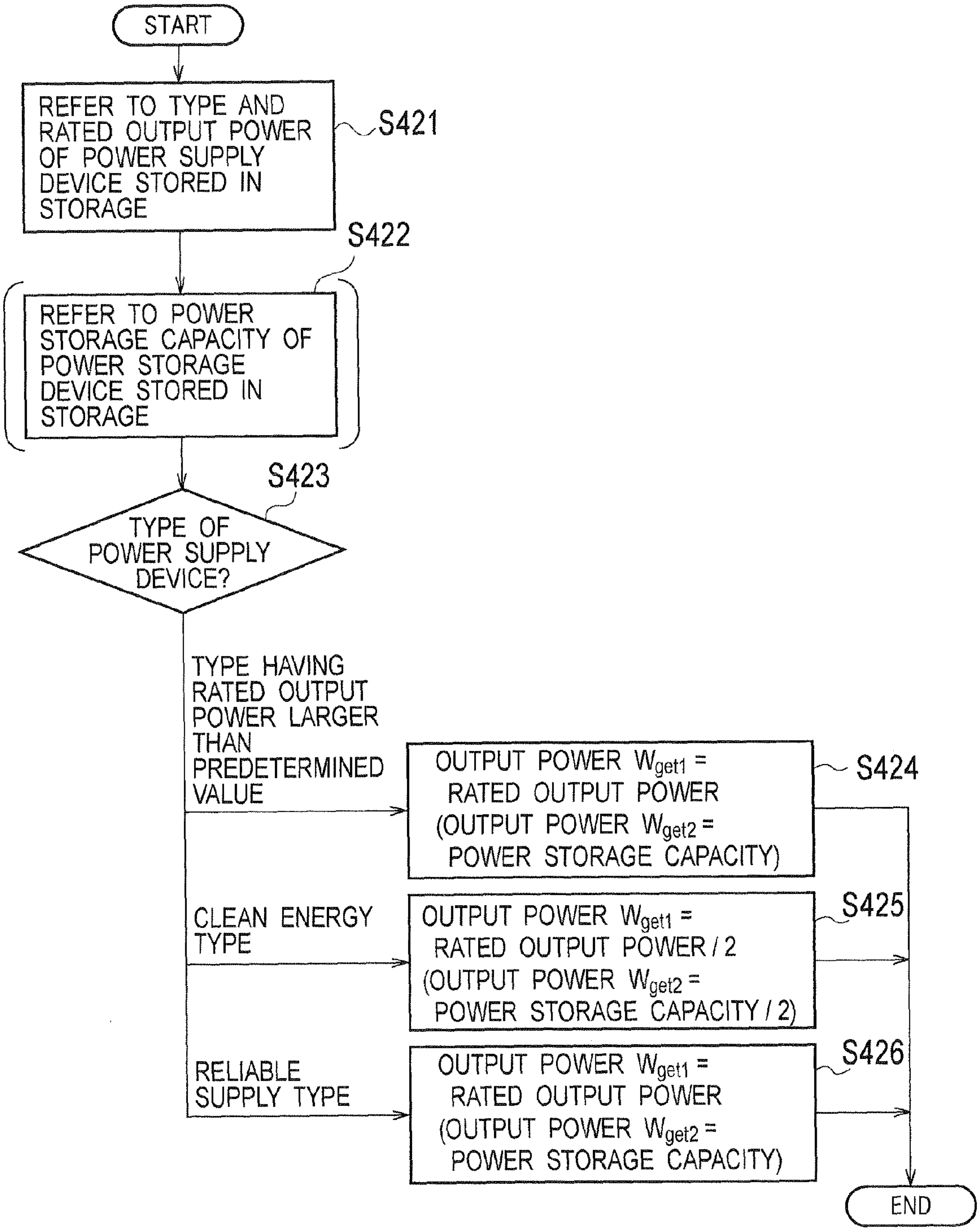
FIG. 22 is a flowchart showing a method of calculating a total estimated obtainable power amount $\Sigma W_{get}$ according to the seventh embodiment.

FIG. 22 is a flowchart showing a method of calculating the total estimated obtainable power amount $\Sigma W_{get}$ according to the seventh embodiment. The flow in FIG. 22 is performed for each customer 30.

In step S421, the calculator 27 refers to the type and the rated output power of the power supply device 32, which are stored in the storage 26.

In step S422, the calculator 27 refers to the power storage capacity of the power storage device 33, which is stored in the storage 26.

In steps S423 to S426, the calculator 27 calculates the estimated obtainable power amount $W_{get}$ of the customer 30 on the basis of the type and the rated output power of the power supply device 32 and the power storage capacity of the power storage device 33.

For example, if the power supply device 32 is a type "having the rated output power larger than a predetermined value," the calculator 27 sets the output power $W_{get1}$ of the power supply device 32 of the customer 30 to the rated output power in step S424. If the customer 30 includes the power storage device 33, the calculator 27 sets the output power $W_{get2}$ of the power storage device 33 of the customer 30 to the power storage capacity.

If the power supply device 32 is a "clean energy type," the calculator 27 sets the output power $W_{get1}$ of the power supply device 32 of the customer 30 to half of the rated output power in step S425. If the customer 30 includes the power storage device 33, the calculator 27 sets the output power $W_{get2}$ of the power storage device 33 of the customer 30 to half of the power storage capacity.

If the power supply device 32 is a "reliable supply type," the calculator 27 sets the output power $W_{get1}$ of the power supply device 32 of the customer 30 to the rated output power in step S426. If the customer 30 includes the power storage device 33, the calculator 27 sets the output power $W_{get2}$ of the power storage device 33 of the customer 30 to the power storage capacity. Here, the output power $W_{get1}$ and the output power $W_{get2}$ in the case of the power supply device 32 of the "clean energy type" is set to half of the rated output power and half of the power storage capacity, respectively; however, these values are merely examples, and different values may be used.

The estimated obtainable power amount $W_{get}$ of the customer 30 is equal to $W_{get1}+W_{get2}$ obtained in the above methods.

The calculator 27 calculates the total estimated consumable power amount $\Sigma W_{cons}$ by adding up the estimated obtainable power amount $W_{get}$ for all the customers 30.

In this flow, the power storage capacity of the power storage device 33 is considered. However, the estimated obtainable power amount $W_{get}$ may be calculated on the basis of the rated output power of the power supply device 32 without considering the power storage capacity of the power storage device 33.

(Advantageous Effects)

In the substation 20 according to the seventh embodiment, the calculator 27 calculates the desired amount of backward flow power on the basis of the history of the power usage amount of each customer 30, and calculates the estimated obtainable power amount $W_{get}$ for each customer 30, from the desired amount of backward flow power. The instruction generator 22 generates the first adjustment instruction including the backward flow power information that indicates the estimated obtainable power amount $W_{get}$ calculated by the calculator 27. Accordingly, the desired amount of backward flow power can be properly calculated, and the shortage of power can be resolved in the time period when the consumed power reaches a peak.

[Other Embodiments]

The present invention has been described above using the embodiments of the present invention. It should be understood, however, that the descriptions and the drawings that constitute part of the disclosure do not limit the present invention. This disclosure will make various alternative embodiments, examples, and operation techniques apparent to those skilled in the art.

For example, the instruction is transmitted to each customer 30 through the two transmission paths in the above-described embodiments; however, the invention is not limited to this configuration. Specifically, the instruction may be transmitted through only one transmission path or through three or more transmission paths.

In addition, the data distribution segment in the terrestrial digital broadcasting is described as an example of the predetermined path for transmitting the instruction in the above-described embodiments; however, the invention is not limited to this configuration. For example, the instruction may be transmitted through BS broadcasting, CS broadcasting, CATV, analog TV broadcasting, radio broadcasting, cable broadcasting, a paging system, a mobile telephone network, wireless communications conforming to 802.11x (wireless LAN), the internet, and the like. Moreover, the instruction may be transmitted by being added to information used for setting the time of a radio clock, or may be transmitted to the customers 30 through a network. If the network is used, the instruction may be updated on a server at fixed intervals.

Moreover, the instruction is transmitted from the substation 20 in the above-described embodiments; however, the invention is not limited to this configuration. Specifically, the instruction may be transmitted from another apparatus (a power company, a broadcasting station, or the like).

In addition, in the aforementioned embodiments, the description has been given for the case where each customer 30 is provided with the power supply device 32. However, each customer 30 may not be provided with the power supply device 32. In this case, the processing of controlling the backward flow power in the grid interconnection device 100 may not include step S24 in FIG. 9 and step S32 in FIG. 12.

Furthermore, although not particularly mentioned in the third embodiment, the grid interconnection device 100 may display on a display device the instruction received, conditions of the devices (the output power, the available storage capacity, the forward flow power (purchased electricity), the backward flow power (sold electricity), the transition graphs of these, or the like) in addition to the display items of the display unit 34. A TV monitor, a PC monitor, and a mobile phone monitor are used as the display device. In addition, the grid interconnection device 100 may remove the code for hiding the instruction from the instruction added to network information received through TV reception waves, the Internet, and the like. Moreover, the grid interconnection device 100 may have a function of receiving information from a television, a personal computer, and a mobile phone. In this case, an instruction to reduce power supplied to the power consumption devices 31 and the like can be sent from the television, the personal computer, and the mobile phone.

In addition, although not particularly mentioned in the second embodiment, the plural customers 30 may be grouped into several groups G so that the backward flow power from the groups G to the power distribution system 50 can be stabilized as in the modification of the first embodiment.

The methods described in the fourth to seventh embodiments can be applied to the second embodiment as well.

What is claimed is:

1. A power control system comprising:

a power distribution facility configured to distribute alternating current power to a power distribution system; and a plurality of customers each including a grid interconnection device configured to interconnect a power storage device to the power distribution system, wherein the plurality of customers are grouped into a plurality of groups, the grid interconnection device comprises:

a controller configured to control input/output power indicating forward flow power that flows from the power distribution system to the power storage device and backward flow power that flows reversely from the power storage device to the power distribution system;

a receiver configured to receive a first adjustment instruction to adjust or set the input/output power, and a second adjustment instruction to adjust a power storage amount in the power storage device, the first adjustment instruction transmitted through a predetermined transmission path, the second adjustment instruction transmitted through the predetermined transmission path before the first adjustment instruction; and a determination unit configured to determine whether or not an own group to which the grid interconnection device belongs to is an application group, on the basis of group information being included in each of the first adjustment instruction and the second adjustment instruction and indicating the application group to which each of the first adjustment instruction and the second adjustment instruction is applied among the plurality of groups, wherein the controller controls the input/output power on the basis of the first adjustment instruction and controls the power storage amount on the basis of the second adjustment instruction if the determination unit determines that the own group is the application group.

2. The power control system according to claim 1, wherein the power distribution facility comprises:

a calculator configured to calculate an adjustment amount or a set amount of the input/output power on the basis of a history of a voltage value of the power distribution system or a history of a power usage amount in the customer; and an instruction generator configured to generate the first adjustment instruction including information that indicates the adjustment amount or the set amount calculated by the calculator.

3. The power control system according to claim 1, wherein the power distribution facility comprises:

a calculator configured to calculate an adjustment amount or a set amount of the input/output power on the basis of a weather condition; and an instruction generator configured to generate the first adjustment instruction including information that indicates the adjustment amount or the set amount calculated by the calculator.

4. The power control system according to claim 1, wherein the power distribution facility comprises:

a calculator configured to calculate an adjustment amount or a set amount of the input/output power on the basis of information on an event that influences power consumption in a customer; and an instruction generator configured to generate the first adjustment instruction including information that indicates the adjustment amount or the set amount calculated by the calculator.

5. A grid interconnection device for interconnecting a power storage device to a power distribution system to which alternating current power is distributed, the grid interconnection device comprising:

a controller configured to control input/output power indicating forward flow power that flows from the power distribution system to the power storage device and/or backward flow power that flows reversely from the power storage device to the power distribution system; and a receiver configured to receive a first adjustment instruction to adjust or set the input/output power, and a second adjustment instruction to adjust a power storage amount in the power storage device, the first adjustment instruction transmitted through a predetermined transmission path, the second adjustment instruction transmitted through the predetermined transmission path before the first adjustment instruction, wherein the first adjustment instruction includes information on target power, the controller controls the input/output power within a range of the target power on the basis of the first adjustment instruction, and controls the power storage amount on the basis of the second adjustment instruction; and wherein the grid interconnection device is provided in a customer wherein the customer is grouped into a group, from among a plurality of groups, with other customer having other interconnection device, the grid interconnection device comprising:

a determination unit configured to determine whether or not an own group is an application group, on the basis of group information being included in each of the first adjustment instruction and the second adjustment instruction and indicating the application group to which each of the first adjustment instruction and the second adjustment instruction is applied among the plurality of groups, wherein the controller controls the input/output power on the basis of the first adjustment instruction and controls the power storage amount on the basis of the second adjustment instruction if the determination unit determines that the own group is the application group.

* * * * *